(12) United States Patent
Yuasa

(10) Patent No.: US 12,193,541 B2
(45) Date of Patent: Jan. 14, 2025

(54) STRUCTURE, MANUFACTURING METHOD FOR STRUCTURE AND SYSTEM FOR MANUFACTURING STRUCTURE

(71) Applicant: KYORAKU CO., LTD., Kyoto (JP)

(72) Inventor: Ryohei Yuasa, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 213 days.

(21) Appl. No.: 17/252,457

(22) PCT Filed: Jun. 28, 2019

(86) PCT No.: PCT/JP2019/025778
§ 371 (c)(1),
(2) Date: Dec. 15, 2020

(87) PCT Pub. No.: WO2020/004611
PCT Pub. Date: Jan. 2, 2020

(65) Prior Publication Data
US 2021/0186154 A1    Jun. 24, 2021

(30) Foreign Application Priority Data

Jun. 28, 2018  (JP) ................................ 2018-123684
Jul. 26, 2018  (JP) ................................ 2018-140391
(Continued)

(51) Int. Cl.
*A43B 17/14*   (2006.01)
*A43B 17/00*   (2006.01)
(Continued)

(52) U.S. Cl.
CPC ............ *A43B 17/14* (2013.01); *A43B 17/006* (2013.01); *B29C 64/118* (2017.08);
(Continued)

(58) Field of Classification Search
CPC ............ B32B 2250/03; B32B 2307/51; B32B 25/045; B32B 25/10; B32B 25/14;
(Continued)

(56) References Cited

U.S. PATENT DOCUMENTS

2001/0007177 A1\* 7/2001 Brown, Jr. ............. A43B 13/12
                                                                  36/27
2003/0101620 A1\* 6/2003 Reed ...................... B29D 35/10
                                                                  36/43
(Continued)

FOREIGN PATENT DOCUMENTS

CN    105361343 A    3/2016
ES     2578730 A1    7/2016
(Continued)

OTHER PUBLICATIONS

Charly Azra et al Smart Mater. Struct. 20 Aug. 2002 (Year: 2011).\*
(Continued)

*Primary Examiner* — Alicia J Weydemeyer
(74) *Attorney, Agent, or Firm* — Maier & Maier, PLLC

(57) ABSTRACT

A structure in which complexity of the moving path of the nozzle during forming is suppressed even if the structure has regions with different elasticity and a manufacturing method for a structure that can suppress complexity of the moving path of the nozzle when forming the structure with regions with different elasticity. The structure includes a formed body with a linear structure formed of a linear resin. The formed body includes first and second elastic regions, and the linear resin forming the first elastic region is thinner than the linear resin forming the second elastic region.

1 Claim, 12 Drawing Sheets

(30) Foreign Application Priority Data

Jul. 26, 2018 (JP) .................................. 2018-140404
Jul. 26, 2018 (JP) .................................. 2018-140410

(51) Int. Cl.
| | |
|---|---|
| *B29C 64/118* | (2017.01) |
| *B29C 64/393* | (2017.01) |
| *B32B 5/18* | (2006.01) |
| *B32B 7/02* | (2019.01) |
| *B32B 27/06* | (2006.01) |
| *B33Y 10/00* | (2015.01) |
| *B33Y 30/00* | (2015.01) |
| *B33Y 50/02* | (2015.01) |
| *B33Y 80/00* | (2015.01) |

(52) U.S. Cl.
CPC .............. *B29C 64/393* (2017.08); *B32B 5/18* (2013.01); *B32B 7/02* (2013.01); *B32B 27/065* (2013.01); *B33Y 10/00* (2014.12); *B33Y 30/00* (2014.12); *B33Y 50/02* (2014.12); *B33Y 80/00* (2014.12)

(58) Field of Classification Search
CPC ......... B32B 27/065; B32B 5/022; B32B 5/18; A43B 1/0009; A43B 13/023; A43B 13/04; A43B 13/125; A43B 13/141; A43B 13/181; A43B 13/186; A43B 13/188; A43B 23/0245; A43B 7/08; A43B 7/141
See application file for complete search history.

(56) References Cited

U.S. PATENT DOCUMENTS

| | | | | |
|---|---|---|---|---|
| 2004/0107601 | A1* | 6/2004 | Schmid | A43B 13/181 |
| | | | | 36/28 |
| 2007/0144110 | A1* | 6/2007 | Aalbers | B32B 27/32 |
| | | | | 52/782.1 |
| 2014/0259787 | A1* | 9/2014 | Guyan | A43B 13/181 |
| | | | | 36/103 |
| 2015/0040428 | A1* | 2/2015 | Davis | A43B 13/12 |
| | | | | 12/146 B |
| 2015/0351493 | A1 | 12/2015 | Ashcroft et al. | |
| 2016/0185041 | A1 | 6/2016 | Lisagor et al. | |
| 2016/0192741 | A1 | 7/2016 | Mark | |
| 2016/0324260 | A1 | 11/2016 | Guyan | |
| 2016/0360828 | A1 | 12/2016 | Guyan | |
| 2016/0374428 | A1* | 12/2016 | Kormann | A43B 23/0215 |
| | | | | 36/28 |
| 2017/0068774 | A1 | 3/2017 | Cluckers et al. | |
| 2017/0266884 | A1 | 9/2017 | Maeda | |
| 2019/0365045 | A1 | 12/2019 | Kiederle et al. | |
| 2020/0329811 | A1 | 10/2020 | Davis | |

FOREIGN PATENT DOCUMENTS

| | | |
|---|---|---|
| JP | H05-043182 U | 6/1993 |
| JP | 2006-158600 A | 6/2006 |
| JP | 2009-183359 A | 8/2009 |
| JP | 3192899 U | 9/2014 |
| JP | 5751567 B1 | 7/2015 |
| JP | 2017-012751 A | 1/2017 |
| JP | 2017-123974 A | 7/2017 |
| JP | 2017-165041 A | 9/2017 |
| JP | 2018-015381 A | 2/2018 |
| JP | 2018-094746 A | 6/2018 |
| JP | 2020509949 A | 4/2020 |
| WO | 2018/115874 A1 | 6/2018 |

OTHER PUBLICATIONS

Search Report issued on Jun. 25, 2021 in corresponding European Application No. 19825413.8; 10 pages.
Office Action issued on May 31, 2022 in corresponding Japanese Patent Application No. 2018-140404; 6 pages Including English-language translation.
Office Action issued on Oct. 19, 2021 in corresponding Japanese Application No. 2018-140391; 6 pages including English-language translation.
Office Action issued on Oct. 19, 2021 in corresponding Japanese Application No. 2018-123684; 8 pages including English-language translation.
Office Action issued on Oct. 28, 2021 in corresponding Chinese Application No. 201980040402.5; 10 pages including English-language translation.
Office Action issued on Jan. 4, 2022 in corresponding Japanese Application No. 2018-140410; 6 pages including English-language translation.
International Search Report issued on Sep. 24, 2019 of corresponding International Application No. PCT/JP2019/025778; 8 pgs.

* cited by examiner

STRUCTURE, MANUFACTURING METHOD FOR STRUCTURE AND SYSTEM FOR MANUFACTURING STRUCTURE

TECHNICAL FIELD

The present invention relates to a structure, a manufacturing method for structure and a system for manufacturing structure.

BACKGROUND ART

First Viewpoint

Techniques for manufacturing structures such as a shoe insole by a three-dimensional modeling equipment have been proposed (see, for example, patent literature 1). In the patent literature 1, the insole is formed by the three-dimensional modeling equipment based on three-dimensional forming data of the foot. In addition, the patent literature 1 discloses that the three-dimensional forming data is corrected in order to suppress pain caused by hallux valgus. Therefore, techniques for correcting the three-dimensional forming data in order to improve usability have been proposed.

Here, as methods of improving the usability of structures, there is a method of changing elasticity of a structure according to each part of the structures. Here, the elasticity (cushioning) of the structures is an index showing the hardness and the softness of the structures. As methods of changing elasticity of the structures, in addition to the first method of changing a resin material according to each part of the structure, there is the second method of changing an arrangement interval (filling rate) of linear resins that forms the structures according to each part of the structures (hereinafter referred to as filling rate control method).

Second Viewpoint

Techniques for manufacturing structures such as a shoe insole by a three-dimensional modeling equipment have been proposed (see, for example, patent literature 1). In the patent literature 1, the insole is formed by the three-dimensional modeling equipment based on three-dimensional forming data of the foot.

Third Viewpoint

Regarding three-dimensional modeling equipment, various proposals have been made to form a covering layer having a linear structure on a base layer by ejecting a linear resin (filament) from a nozzle on the base layer to form the linear structure (see, for example, patent literature 2). In the three-dimensional modeling equipment described in patent literature 2, the linear resin is ejected from the nozzle to the base layer with the nozzle's being spaced from the base layer.

Here, by changing constituent materials of the base layer and resin materials of the covering layer, it is possible to manufacture the structure with various functions by using the three-dimensional modeling equipment. For example, in a case of manufacturing shoe insoles, an upper surface side of the insole may be formed of a soft resin, and a lower surface side of the insole may be formed of a hard resin. Therefore, by configuring the insoles, a human load can be softly received on the upper surface side of the insole, and a shape of the insole can be suppressed on the lower surface side of the insole.

Fourth Viewpoint

Patent literature 3 is disclosed that an outer layer part made of elastic resin materials and an inner layer part made of materials that deform when a load is applied and retains its shape when the load is no longer applied. Since the cushion materials described in patent literature 3 have above configurations, it has effects of retaining the shapes and ensuring flexibility.

CITATION LIST

Patent Literature

[Patent Literature 1] Japanese Unexamined Patent Application No. 2017-123974
[Patent Literature 2] Japanese Unexamined Patent Application No. 2018-94746
[Patent Literature 3] Japanese Unexamined Patent Application No. 2018-15381

SUMMARY OF INVENTION

Technical Problem

First Viewpoint

As a forming method using the three-dimensional modeling equipment, there is a method of modeling a structure by moving the nozzle that ejects a linear resin. When forming structures by a filling rate control method using such a three-dimensional modeling equipment, a moving pitch of the nozzle is different between the first elastic region where a arrangement interval of the linear resin is the first arrangement interval and the second elastic region where an arrangement interval of the linear resin is the second arrangement interval. Therefore, when forming structures by the filling rate control method using the three-dimensional modeling equipment of an above-mentioned method, a moving path of the nozzle may be complicated.

A present invention is made in view of above backgrounds, a purpose of present invention is to provide a structure in which complexity of the moving path of the nozzle during forming is suppressed even if the structure has regions with different elasticity and a manufacturing method for a structure that can suppress complexity of the moving path of the nozzle when forming the structure with regions with different elasticity.

Second Viewpoint

For example, in a case of a structure worn on a human body, it is possible to improve usability of the structure by forming the structure after understanding where and how much pressure is applied to the structure. The three-dimensional modeling equipment described in patent literature 1 acquires the three-dimensional forming data of the foot, while the techniques described in patent literature 1 tend to limit improvement of usability. In the techniques described in patent literature 1, for example, the structure (insole) of similar shape will be created for two human bodies with different weights but similar foot shapes. For example, even if the shapes of the foot are the same, it may be preferable to form the structure with higher elasticity (cushioning) for a heavier human body.

The present invention is made in view of above backgrounds, the purpose of present invention is to provide a manufacturing method for structure and a system for manufacturing structure that can improve usability of the structure.

Third Viewpoint

If the constituent materials of the base layer and the resin materials of the covering layer are different, the covering layer may be easily peeled off from the base layer. In particular, as in the techniques described in patent literature 2, if the linear resin is ejected from the nozzle to the base layer with the nozzle's being spaced from the base layer, an entire covering layer is formed on the surface of the base layer, and the covering layer is easily peeled off from the base layer.

The present invention is made in view of above backgrounds, the purpose of present invention is to provide a structure and a manufacturing method for structure that makes it difficult for the covering layer to be peeled off from the base layer.

Fourth Viewpoint

By the way, depending on a use of cushion materials, it may be preferable to set an optimum shape for each user so that the optimum shape is retained during the user's use. Since the inner layer part of the cushion materials described in patent literature 3 is deformed when a load is applied, the inner layer part cannot be used for such use.

The present invention is made in view of above backgrounds, the purpose of present invention is to provide a structure that can be easily transformed into a shape set for each user, whose shape is retained during user's use, and that has an excellent usability.

Solution to Problem

First Viewpoint

The present invention provides a structure comprising: a formed body including a linear structure formed of a linear resin; wherein the formed body includes first and second elastic regions, and the linear resin forming the first elastic region is thinner than the linear resin forming the second elastic region.

According to the present invention, the linear resin forming the first elastic region is thinner than the linear resin forming the second elastic region. Therefore, even if the elasticity of the first elastic region and the elasticity of the second elastic region are different, it is not necessary to change the arrangement interval of the linear resin in the first elastic region and the arrangement interval of the linear resin in the second elastic region. And as a result, in the structure of the present invention, the complexity of the moving path of the nozzle during forming is suppressed.

Various embodiments of the present invention are described below. Any of the embodiments described below can be combined with one another.

Preferably, the formed body is formed by laminating the linear structures, the first and second elastic regions extend from a bottom layer of the linear structures to a top layer of the linear structures, and the first and second elastic regions are connected directly.

The embodiment provides a manufacturing method for a structure using a three-dimensional modeling equipment with a nozzle configured to eject a linear resin, the manufacturing method comprising: a forming step of forming a formed body by ejecting the linear resin from the nozzle while moving the nozzle; wherein, while the forming step is performed, a thickness of the linear resin ejected from the nozzle is changed.

Second Viewpoint

The present invention provides a manufacturing method for a structure using a three-dimensional modeling equipment with a nozzle configured to eject a linear resin, the manufacturing method comprising: an acquiring step of acquiring pressure distribution data indicating a load applied to a forming target; a generating step of generating forming data of the structure based on the pressure distribution data; and a forming step of forming the structure by moving the nozzle based on the forming data.

According to the present invention, it is possible to improve usability of the structure by forming the structure based on the forming data generated based on the pressure distribution data.

Various embodiments of the present invention are described below. Any of the embodiments described below can be combined with one another.

Preferably, the forming data has moving path data and thickness data, the moving path data defines a moving pitch when the nozzle is moved in two-dimensions, and the thickness data is associated with the moving path data and defines a thickness of the linear resin ejected from the nozzle, the generating step has a step of changing the moving path data or the thickness data according to the pressure distribution data.

Preferably, the acquiring step has a step of further acquiring the external shape data of the forming target, the generating step has a step of generating the forming data based on the pressure distribution data and the external shape data.

Preferably, the forming step has a step forming the structure so that a flexibility of the structure changes based on the forming data.

The embodiment provides a system for manufacturing structure comprising: an acquiring part configured to acquire pressure distribution data that indicates a load applied to a forming target; a generating part configured to generate forming data for the structure based on the pressure distribution data; and a forming part including a three-dimensional modeling equipment with a nozzle configured to eject a linear resin, the forming part being configured to form the structure by moving the nozzle based on the forming data.

Preferably, the forming data has moving path data and thickness data, the moving path data defines a moving pitch when the nozzle is moved in two-dimensions, and the thickness data is associated with the moving path data and defines the thickness of the linear resin ejected from the nozzle, the generating part is configured to change the moving path data or the thickness data according to the pressure distribution data.

Preferably, the forming part is configured to form the structure so that flexibility of the structure changes based on the forming data.

Third Viewpoint

The present invention provides a structure comprising: a base layer; and a covering layer including a linear structure and an impregnated layer, the covering layer being made of a resin material that is different from a resin material forming the base layer; wherein the linear structure is configured to cover at least a part of the base layer, the linear structure is formed on the impregnated layer, and a resin forming the impregnated layer is impregnated in the base layer.

According to the present invention, since the resin forming the impregnated layer, that is, the resin forming a part of the covering layer is impregnated in the base layer, it is possible to bond between the covering layer and the base layer strongly. Therefore, according to the present invention, even if the covering layer is made of the resin material different from the resin material that forms the base layer, the configuration of the present invention prevents the covering layer from peeling off from the base layer.

Various embodiments of the present invention are described below. Any of the embodiments described below can be combined with one another.

Preferably, the base layer is formed of foam, and the resin forming the impregnated layer is impregnated in bubbles of the foam.

The embodiment provides a manufacturing method for a structure including a base layer, and a covering layer including a linear structure and an impregnated layer, the covering layer being made of a resin material that is different from a resin material forming the base layer, the manufacturing method comprising: an impregnated layer forming step of forming an impregnated layer in the base layer by ejecting a linear resin from a nozzle, which is configured to eject the linear resin, into the base layer while pushing the nozzle ejecting the linear resin on the base layer; and a linear structure forming step of forming the linear structure by ejecting the linear resin from the nozzle while moving the nozzles on an upper side of the base layer.

Preferably, in the impregnated layer forming step, a pushing amount that the nozzle is pushed on the base layer is equal to or larger than a thickness of the linear resin.

Preferably, the base layer is formed of foam, and the impregnated layer forming step has a step of ejecting the linear resin from the nozzle into the base layer while pushing the nozzle on the base layer so that the linear resin is impregnated in bubbles of the foam.

Fourth Viewpoint

According to the present invention, the present invention provides a structure comprising: a base layer made of a shape memory material containing a shape memory polymer; and a covering layer made of a soft material and covering at least a part of the base layer.

In the configuration of the present invention, the base layer is made of a shape memory material containing a shape memory polymer, and the covering layer is made of the soft material. The shape memory polymer has a property that an elastic modulus changes significantly near a glass-transition temperature. Therefore, when transforming the shape of the structure, the base layer is heated to a temperature higher than the glass-transition temperature, and after the shape is transformed, the base layer is cooled to a temperature lower than the glass-transition temperature, as a result, the shape of structure can be easily transformed into a shape set for each user, and the transformed shape is retained in use. On the other hand, if this base layer contacts directly with the user, usability may be poor. However, since the covering layer of the structure of the present invention is made of the soft material, the usability can be improved by arranging the covering layer on a part that contacts with the user.

Various embodiments of the present invention are described below. Any of the embodiments described below can be combined with one another.

Preferably, a glass-transition temperature Tg of the shape memory polymer is 35 to 100 degrees Celsius.

Preferably, a ratio of an elastic modulus of the shape memory polymer at Tg+20 degrees Celsius to an elastic modulus of the shape memory polymer at Tg−20 degrees Celsius is equal to or larger than 10.

Preferably, the base layer and the covering layer are formed by laminating a linear structure which is formed of a linear resin by two-dimensionally moving a nozzle configured to eject a linear resin.

Preferably, the linear structure includes a plurality of grooves extending parallel to one another.

Preferably, two linear structures are provided adjacent in a laminating direction, one of the two linear structure includes one groove, and the other of the two linear structure includes the other groove, and the one groove intersects the other groove.

The embodiment provides a manufacturing method for a structure comprising: a base layer forming step of forming a base layer by laminating a first linear structure, the first linear structure being formed by two-dimensionally moving a nozzle configured to eject a first linear resin made of a shape memory material containing a shape memory polymer; and a covering layer forming step of forming a covering layer by laminating a second linear structure, the second linear structure being formed by two-dimensionally moving the nozzle configured to eject a second linear resin made of a soft material, wherein the covering layer covers at least a part of the base layer.

Preferably, the covering layer forming step is performed after the base layer forming step, and the covering layer is formed on the base layer as a base.

Preferably, the covering layer forming step is performed before the base layer forming step, and the base layer is formed on the covering layer as a base, and a temperature of the first linear resin when forming a bottom layer of the base layer is higher than an average temperature of the first linear resin when forming a layer other than the bottom layer of the base layer.

BRIEF DESCRIPTION OF DRAWINGS

FIGS. 2A to 2C are common on the first to the fourth viewpoint of the embodiments.

FIGS. 3A and 3B are common on the first and the second viewpoint of the embodiments.

FIGS. 4A and 4B are common on the first and the second viewpoint of the embodiments.

DESCRIPTION OF EMBODIMENTS

Embodiments of the present invention will be described below. Any of the embodiments described below can be combined with one another. And the invention is established independently for each feature.

Embodiments of First Viewpoint

1. Structure 1

Figure 1:
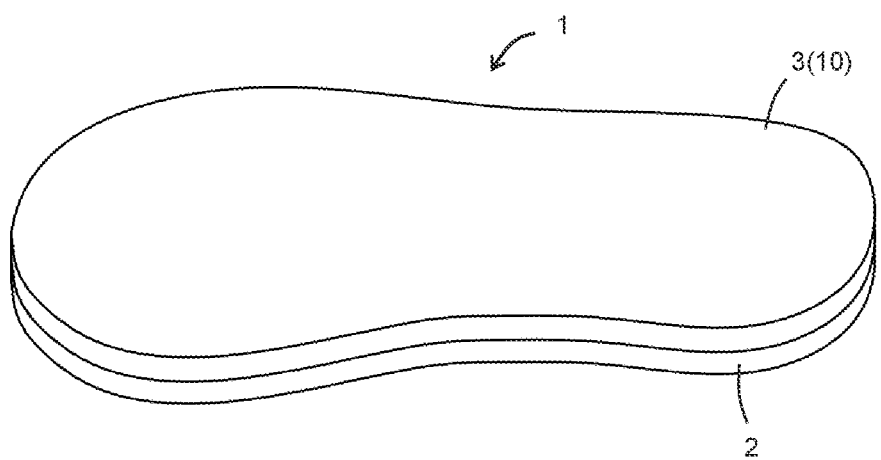
FIG. 1 is a perspective view schematically showing a structure 1 with a formed body 10 of the embodiments of the first to fourth viewpoints.

As shown in FIG. 1, the structure 1 includes the base layer 2 and the covering layer 3. The structure 1 is used in a field of nursing (supporters for decubitus prevention, supporters for talipes equinus prevention, children's splints, etc.) and sports applications (shoes insoles, etc.). The usability of the structure 1 can be improved by arranging the covering layer 3 made of the soft material. The structure 1 is suitable for applications where the covering layer 3 is used in contact with a living body (eg, the human body). In the embodiment, the structure 1 is the shoe insole.

1-1. Base Layer 2

The base layer 2 is the layer on which the covering layer 3 is formed, and the base layer 2 and the covering layer 3 are in close contact with each other. The base layer 2 can be formed of, for example, the foam or the sponge body. The resin material that constitutes the base layer 2 is not particularly limited. The embodiments will be described as an example in which the structure 1 includes the base layer 2 and the covering layer 3, but the embodiments are not limited thereto. The structure 1 does not necessarily include the base layer 2.

1-2. Covering Layer 3

Figure 3A:
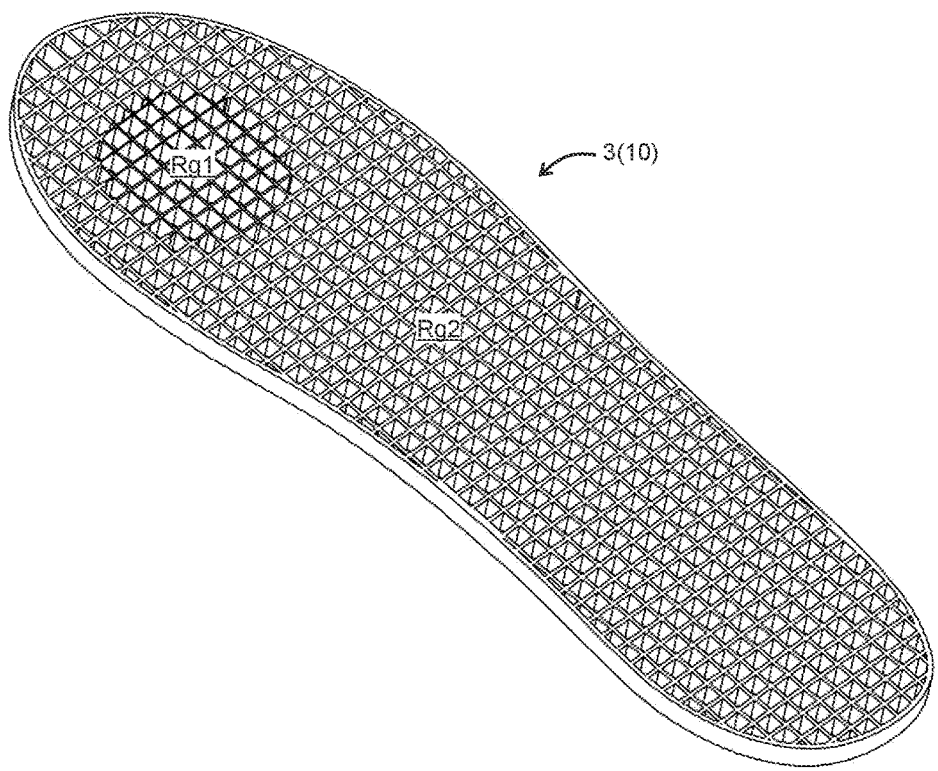
FIG. 3A is a perspective view of the formed body 10 with different linear resin thickness between the first elastic region Rg1 and the second elastic region Rg2.
Figure 3B:
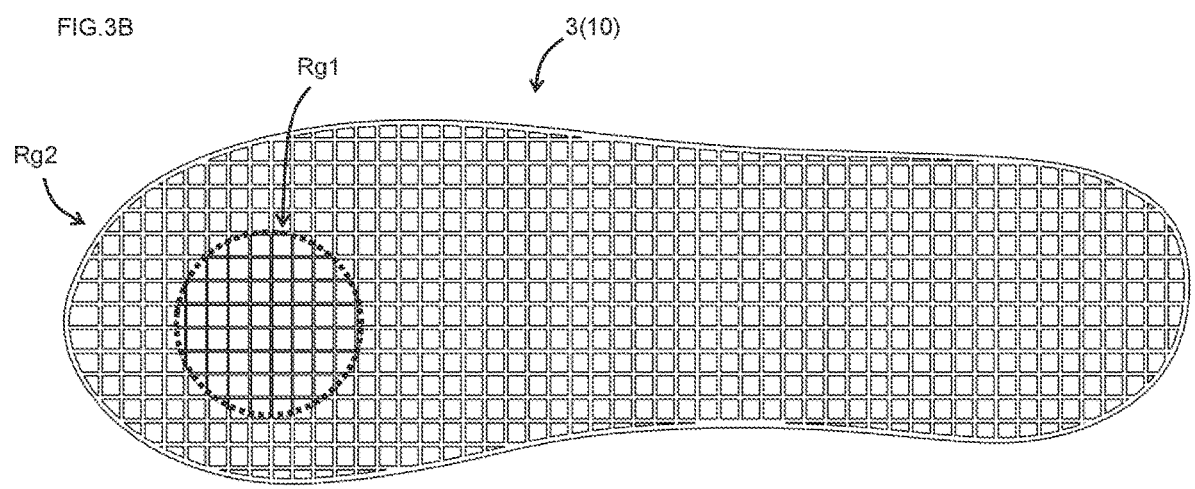
FIG. 3B is a top view of the formed body 10 shown in FIG. 3A.

The covering layer 3 covers at least a part of the base layer 2. The covering layer 3 is made of the resin material different from the resin material forming the base layer 2. As shown in FIGS. 3A and 3B, the covering layer 3 is formed of the formed body 10. In the embodiment, the covering layer 3 is formed only of the formed body 10, but the covering layer 3 may be formed of other than the formed body 10. The formed body 10 is formed by laminating two types of the linear structures (the linear structure 4 and 5 described later).

1-2-1. Linear Structures 4 and 5

Figure 2A:
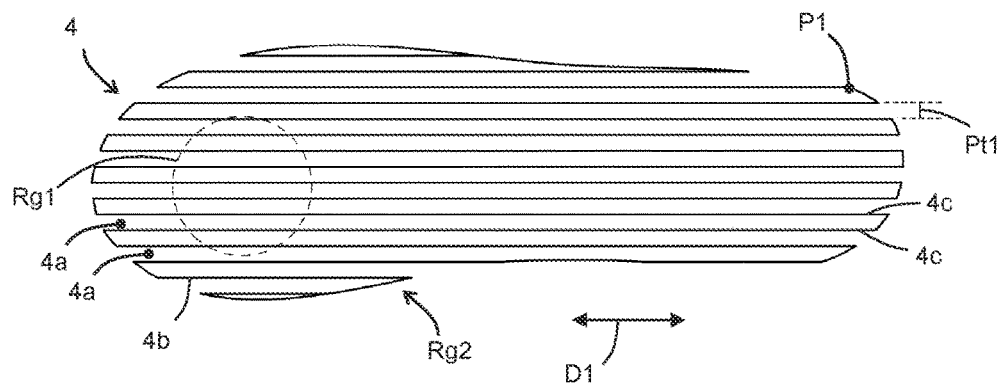
FIG. 2A is a schematic view of a linear structure 4 formed by moving the nozzle that ejects a linear resin 4b mainly in the first direction D1.
Figure 2B:
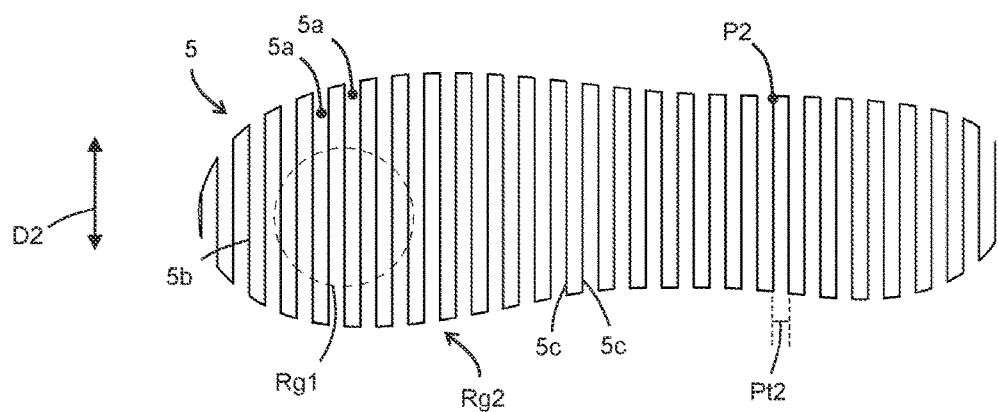
FIG. 2B is a schematic view of the linear structure 5 formed by moving the nozzle that ejects a linear resin 5b mainly in the second direction D2.

As shown in FIGS. 2A and 2B, the linear structures 4 and 5 are formed of one linear resin 4b and 5b. As shown in FIG. 2A, the linear resin 4b forming the linear structure 4 extends to the first direction D1 and as shown in FIG. 2B, the linear resin 5b forming the linear structure 5 extends to the second direction D2. In this embodiment, the first direction D1 and the second direction D2 are orthogonal to each other, but the first direction D1 and the second direction D2 may not be orthogonal to each other. Further, a plurality of grooves 4a and 5a are formed on the linear structures 4 and 5. The grooves 4a extend to the first direction D1 and the grooves 5a extend to the second direction D2 in parallel. That is, the pair of the linear parts 4c, which are adjacent to one another, of the linear resin 4b are spaced apart, and in the same way, the pair of the linear parts 5c, which are adjacent to one another, of the linear resin 5b are spaced apart.

The formed body 10 includes a plurality of the linear structures 4 and a plurality of the linear structures 5, and the linear structure 4 and the linear structure 5 are alternately laminated. Therefore, as shown in FIGS. 3A and 3B, the formed body 10 is formed in a mesh shape, and a large number of holes 3a are formed in the formed body 10. As a result, the breathability of the structure 1 is improved, and the elasticity of the covering layer 3 of the structure 1 can be improved.

1-2-2. First and Second Elastic Regions Rg1 and Rg2

As shown FIGS. 3A and 3B, the formed body 10 includes first and second elastic regions Rg1 and Rg2. The linear resin forming the first elastic region Rg1 is thinner than the linear resin forming the second elastic region Rg2. Specifically, the linear structure 4 includes the first and second elastic regions Rg1 and Rg2, and the linear structure 5 also includes the first and second elastic regions Rg1 and Rg2.

Here, when the linear structures 4 and 5 are viewed from above, the first elastic region Rg1 overlaps with the first elastic region Rg1 of the linear structure 5 so that the outer edge of the first elastic region Rg1 of the linear structure 4 matches with the outer edge of the first elastic region Rg1 of the linear structure 5. In the same way, when the linear structures 4 and 5 are viewed from above, the second elastic region Rg2 of the linear structure 4 overlaps with the second elastic region Rg2 of the linear structure 5 so that the edges (the outer edge and the inner edge) of the second elastic region Rg2 of the linear structure 4 matches with the edges (the outer edge and the inner edge) of the second elastic region Rg2 of the linear structure 5. Therefore, since the first and second elastic regions Rg1 and Rg2 of the linear structure 4 overlaps with the first and second elastic regions Rg1 and Rg2 of the linear structure 5, the first and second elastic regions Rg1 and Rg2 of the formed body 10 extends from the bottom layer to the top layer of the linear structures 4 and 5.

The first elastic region Rg1 is arranged inside the second elastic region Rg2. Furthermore, the first elastic region Rg1 and the second elastic region Rg2 are connected directly.

That is, there is no intervening region between the first elastic region Rg1 and the second elastic region Rg2.

2. About Three-Dimensional Modeling Equipment 50

Figure 4A:
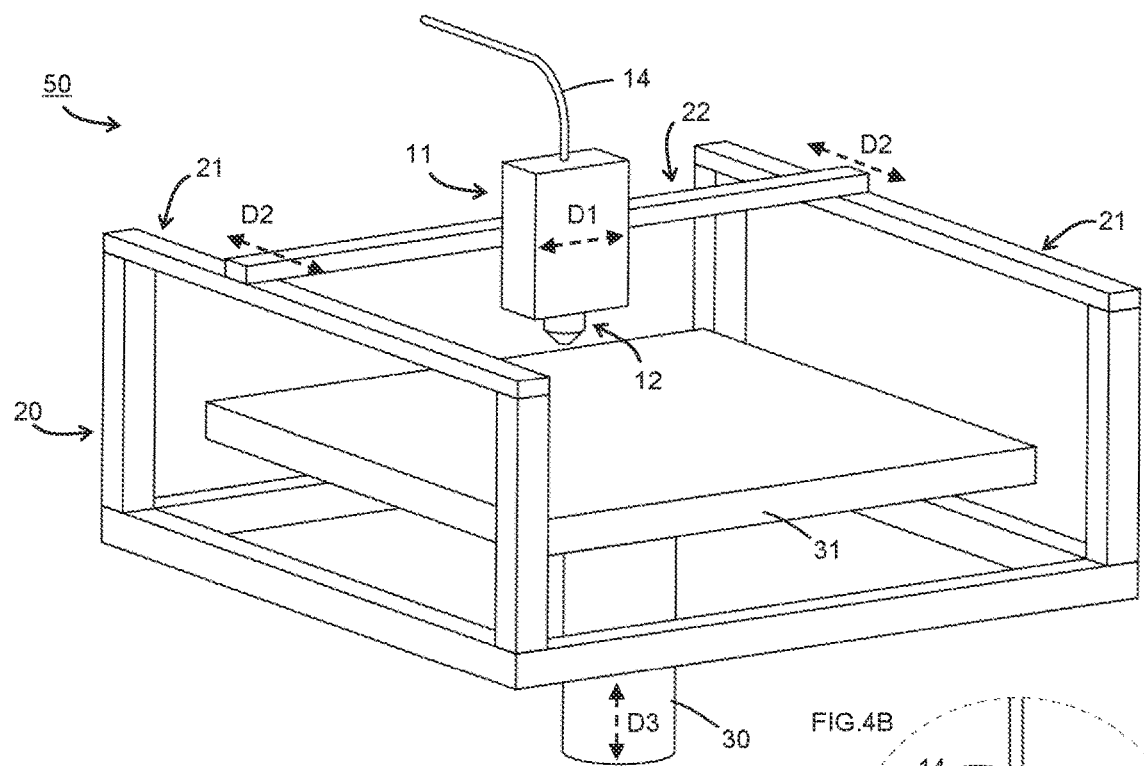
FIG. 4A is a perspective view schematically showing a three-dimensional modeling equipment 50 that manufactures the formed body 10 of the embodiment.
Figure 5:
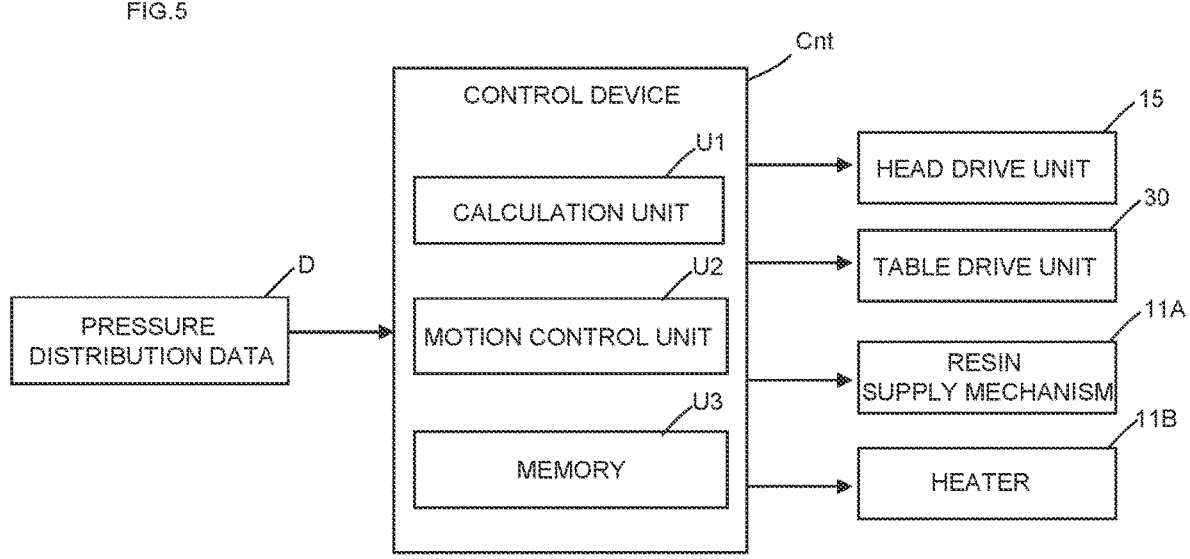
FIG. 5 is a functional block diagram of a control device Cnt that controls the three-dimensional modeling equipment 50.

As shown in FIG. 4A, the three-dimensional modeling equipment 50 is used as the manufacturing method for the structure 1. The three-dimensional modeling equipment 50 includes a head 11, a nozzle 12, a frame 20, a pair of first guide parts 21, a second guide part 22, a table drive unit 30, and a forming table 31. a wire material 14 made of resin is inserted in the head 11. Although not shown in FIG. 4A, the three-dimensional modeling equipment 50 includes a first drive unit that moves the head 11 along the second guide part 22 and a second drive unit that moves the second guide part 22 along the pair of second guide parts 22. The first drive unit and the second drive unit correspond to the head drive unit 15 shown in FIG. 5. Furthermore, as shown in FIG. 5, the three-dimensional modeling equipment 50 includes the control device Cnt that controls various actuators.

2-1. Configuration of Three-Dimensional Modeling Equipment 50

Figure 4B:
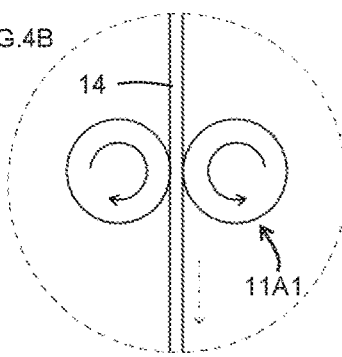
FIG. 4B is a schematic view of a gear mechanism 11A1 provided inside the head 11 shown in FIG. 4A.

The head 11 is provided in the second guide part 22, and the head 11 is configured to move freely in the first direction D1. The resin supply mechanism 11A and a heater 11B (see FIG. 5) are provided in the head 11. The resin supply mechanism 11A is a mechanism that sends the wire material 14 inserted in the head 11 to the nozzle 12, and the resin supply mechanism 11A includes a gear mechanism 11A1 (see FIG. 4B) and a motor that rotates the gear mechanism (not shown). The wire material 14 is bitten into the gear mechanism of the resin supply mechanism 11A, and when this gear mechanism rotates, the wire material 14 is sent out to the nozzle 12. Also, the heater 11B is arranged on the top of the nozzle 12. When the heater 11B heats the wire material 14, the wire material 14 is softened, and the softened wire material 14 is ejected from the nozzle 12 as the linear resin. In the embodiment, sending the wire material 14 to the nozzle 12 by the gear mechanism 11A1 is explained, but the present invention is not limited to this. For example, the three-dimensional modeling equipment 50 may be configured to supply a pellet-type resin to the nozzle 12, and specifically, the three-dimensional modeling equipment 50 may be provided with a screw for supplying the pellet resin to the nozzle 12 and a motor for rotating the screw instead of the gear mechanism 11A1.

The nozzle 12 is fixed at the bottom of the head 11. By the head 11 moving toward the second guide part 22 and the second guide part 22 moving toward the pair of the first guide parts 21, the nozzle 12 is moved on the forming table 31 in two-dimensions.

The frame 20 supports a pair of the first guide part 21 and the second guide part 22. The forming table 31 is arranged inside the frame 20. The table drive unit 30 includes a function to move the forming table 31 up and down. Each time the linear structure of any layer is formed, the table drive unit 30 moves the forming table 31 downward, so that the three-dimensional modeling equipment 50 can laminate the linear structure.

2-2. Functional Block of Control Device Cnt

The Control device Cnt of the three-dimensional modeling equipment 50 acquires the target data related to the target (in this Embodiment, the foot of the human body) that uses the structure 1. The acquired target data is, for example, the pressure distribution data or the external shape data. The pressure distribution data is the data indicating the load applied to the target, and the external shape data is the data indicating the surface shape of the target.

As shown in FIG. 5, the control device Cnt includes a calculation unit U1, a motion control unit U2, and a memory U3. The calculation unit U1 generates the forming data for forming the formed body 10 based on the acquired target data. This forming data includes the moving path data and the thickness data. In addition, the motion control unit U2 controls the head drive unit 15, the table drive unit 30, the resin supply mechanism 11A, and the heater 11B. The memory U3 stores various data such as the forming data.

Each functional part included in the control device Cnt includes a dedicated hardware or a Micro Processing Unit (MPU) that executes a program stored in the memory U3. When the control device Cnt is the dedicated hardware, for example, the control device Cnt can be a single circuit, a composite circuit, an ASIC (application specific integrated circuit), an FPGA (field-programmable gate array), or a combination of these. Each of the functional parts realized by the control device Cnt may be realized by individual hardware, or each functional part may be realized by one hardware. When the control device Cnt is an MPU, each function of the control device Cnt executes is realized by software, firmware, or a combination of software and firmware. The software and the firmware are described as a program and stored in the memory U3. The MPU realizes each function of the control device Cnt by reading and executing the program stored in the memory U3. The memory U3 is a non-volatile or volatile semiconductor memory such as RAM, ROM, flash memory, EPROM, EEPROM.

The moving path data is the data that defines the path of the nozzle 12 when moving the nozzle 12 in two-dimensions. For example, the moving path data defines the moving pitch of the nozzle 12 when the nozzle 12 is moved two-dimensionally, and the coordinates of the nozzle 12 when the nozzle 12 is moved two-dimensionally. On the linear structure 4 shown in FIG. 2A, the moving pitch defined by the moving path data corresponds to the pitch Pt1, and on the linear structure 5 shown in FIG. 2B, the moving pitch defined by the moving path data corresponds to the pitch Pt2. Further, in the linear structure 4 shown in FIG. 2A, the coordinates defined by the moving path data are the coordinates such as the coordinates P1 of the outer edge of the second elastic region Rg2, and in the linear structure 5 shown in FIG. 2B, the coordinates defined by the moving path data are the coordinates such as the coordinates P2 of the outer edge of second elastic region Rg2. In addition, the coordinates defined by the moving path data include the coordinates that define the boundary between the first elastic region Rg1 and the second elastic region Rg2. The embodiments will be described as the moving path data changes based on the target data, but the embodiments are not limited thereto. Even if the target data is different, the same moving path data may be used.

The thickness data is related with the moving path data, and the thickness data is the data that determines the thickness of the linear resin ejected from the nozzle 12. In general, the thicker the linear resin, the harder the formed body 10, and the thinner the thickness of the thickness of the linear resin, the softer the formed body 10. The thickness of the linear resin ejected from the nozzle 12 can be changed by changing the amount of the wire material 14 (the length of the wire material 14) sent out per unit time from the resin supply mechanism 11A to the nozzle 12. In other words, since the motion control unit U2 controls the resin supply mechanism 11A, the thickness of the linear resin ejected from the nozzle 12 changes. Therefore, in the embodiment, the thickness data corresponds to the control data of the resin supply mechanism 11A.

Further, the technics for changing the thickness of the linear resin ejected from the nozzle 12 is not limited to this. The nozzle 12 may be configured so that an opening diameter for ejecting the linear resin is variable. That is, the nozzle 12 is provided with a diameter changing mechanism that changes the opening diameter of the nozzle 12, and the motion control unit U2 controls the diameter changing mechanism based on the forming data. The thickness data of this forming data corresponds to the control data of the diameter changing mechanism. The larger the opening diameter of the nozzle 12, the thicker the thickness of the linear resin.

Further, the thickness of the linear resin ejected from the nozzle 12 can be changed, for example, by changing moving speed of the nozzle 12. That is, the thickness of the linear resin ejected from the nozzle 12 can be changed by changing a moving range per unit time of the nozzle 12. In this case, the thickness data corresponds to the control data of the head drive unit 15. As the moving speed of the nozzle 12 becomes slower, the amount of the linear resin ejected from the nozzle 12 to an arbitrary part also increases, so that the thickness of the linear resin becomes thicker.

3. Manufacturing Method for Structure 1

The manufacturing method for the structure 1 of the embodiment includes an acquiring step, a generating step, and a forming step.

3-1. Acquiring Step

In the acquiring step, for example, the control device Cnt acquires the target data from a measuring device. The measuring device corresponds to a device that measures the pressure distribution of the foot and a device that scans the outer shape of the foot.

3-2. Generating Step

In the generating step, the calculation unit U1 of the control device Cnt generates the forming data of the formed body 10 based on the target data. This generated forming data includes the moving path data and the thickness data as described above. In the embodiment, the moving path data defines the range of the first and second elastic regions Rg1 and Rg2 in addition to defining the path to move the nozzle 12. The thickness data related to this moving path data defines the control data of the resin supply mechanism 11A in the first elastic region Rg1 (a sending amount of the wire material 14) and the control data of the resin supply mechanism 11A in the second elastic region Rg2 (a sending amount of the wire material 14). The sending amount of the wire material 14 refers to the amount of the wire material 14 sent by the resin supply mechanism 11A to the nozzle 12 per unit time.

3-3. Forming Step

In the forming step, the motion control unit U2 of the control device Cnt controls the head drive unit 15, the table drive unit 30 and the resin supply mechanism 11A based on the forming data. In the forming step, the base layer 2 formed in advance is placed on the forming table 31. The base layer 2 can also be formed in the forming step.

Moreover, in the embodiment, each of the linear resin forming the linear structures 4 and 5 is formed of one linear resin. That is, the path of the nozzle 12 when moving the nozzle 12 in two-dimensions is a single stroke. The shapes of the linear resin 4b and 5b shown in FIGS. 2A and 2B correspond to the paths of the nozzle 12 when forming the linear structures 4 and 5 in the forming step.

Figure 6:
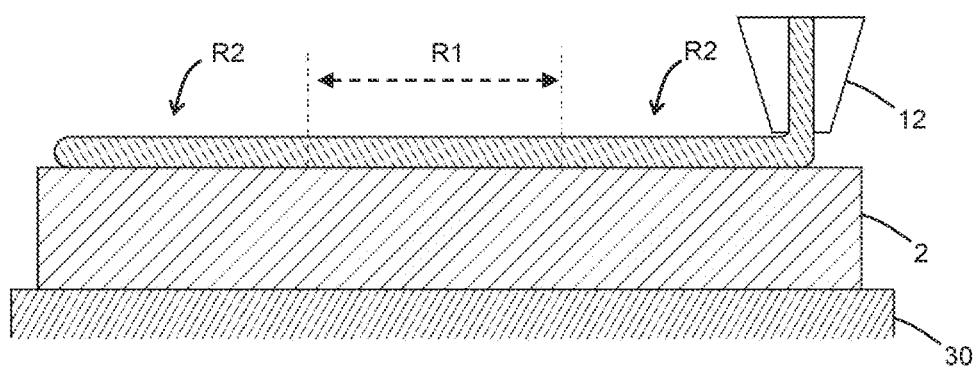
FIG. 6 is a schematic view in which a nozzle 12 ejects the linear resin on a covering layer 3 arranged on a forming table 31.

When the motion control unit U2 controls the head drive unit 15, the table drive unit 30 and the resin supply mechanism 11A based on the forming data, each configuration operates as follows. That is, as shown in FIG. 6, when the nozzle 12 passes through the part belonging to the second elastic region Rg2 in the path of the nozzle 12, the resin supply mechanism 11A operates so that the sending amount of the wire material 14 increases. Also, when the nozzle 12 passes through the part belonging to the first elastic region Rg1 in the path of the nozzle 12, the resin supply mechanism 11A operates so that the sending amount of the wire material 14 decreases. As a result, the thickness of the linear resin forming the first elastic region Rg1 becomes thinner than the thickness of the linear resin forming the second elastic region Rg2.

When the motion control unit U2 finishes moving the nozzle 12 so that the nozzle 12 passes the path corresponding to one of the shapes of the linear resin 4b and 5b, the motion control unit U2 controls the table drive unit 30 to move the forming table 31 downward. Then, after the motion control unit U2 moves the nozzle 12 so that the nozzle 12 passes the path corresponding to the other shape of the linear resin 4b and 5b, the motion control unit U2 controls the table drive unit 30 to move the forming table 31 downward. In this way, by repeating the movement of the nozzle 12 and the forming table 31, the formed body 10 is formed on the base layer 2, and as a result, the three-dimensional modeling equipment 50 can form the structure 1.

4. Effect of Embodiment

The formed body 10 includes the first and second elastic regions Rg1 and Rg2, and the thickness of the linear resin forming the first elastic region Rg1 is thinner than the thickness of the linear resin forming the second elastic region Rg2. That is, the formed body 10 includes a different elasticity (cushioning) depending on a part, and as a result, a composition of the formed body 10 can improve the usability of the formed body 10. Specifically, the first elastic region Rg1 is softer than the second elastic region Rg2 and more cushioning than the second elastic region Rg2. Therefore, the load of the user's foot is softly received by the first elastic region Rg1 of the formed body 10. The forming positions of the first and second elastic regions Rg1 and Rg2 shown in FIG. 2A are examples, and the present embodiment of the invention is not limited to these forming positions.

Here, in the embodiment, the moving pitch when moving the nozzle 12 in two-dimensions is the same in both the first elastic region Rg1 and the second elastic region Rg2. Specifically, in the case of forming the linear structure 4, the moving pitch when the nozzle 12 is moved in two-dimensions is the pitch Pt1 shown in FIG. 2A, that is, constant in all regions. Also, in the case of forming the linear structure 5, the moving pitch when the nozzle 12 is moved in two-dimensions is the pitch Pt2 shown in FIG. 2B, that is, constant in all regions.

Although the formed body 10 includes a different elastic (cushioning) depending on a part, the three-dimensional modeling equipment 50 can form the formed body 10 while keeping the moving pitch constant when moving the nozzle 12 in two-dimensions. Therefore, even if the formed body 10 includes a different elastic (cushioning) depending on a part, complexity of the two-dimensional moving path of the nozzle 12 is suppressed. Therefore, when manufacturing the formed body with a different cushioning depending on a part, it is possible to avoid being unable to form using the three-dimensional modeling equipment or due to the complexity of the two-dimensional moving path or to avoid the need to change the composition of the formed body.

Figure 7:
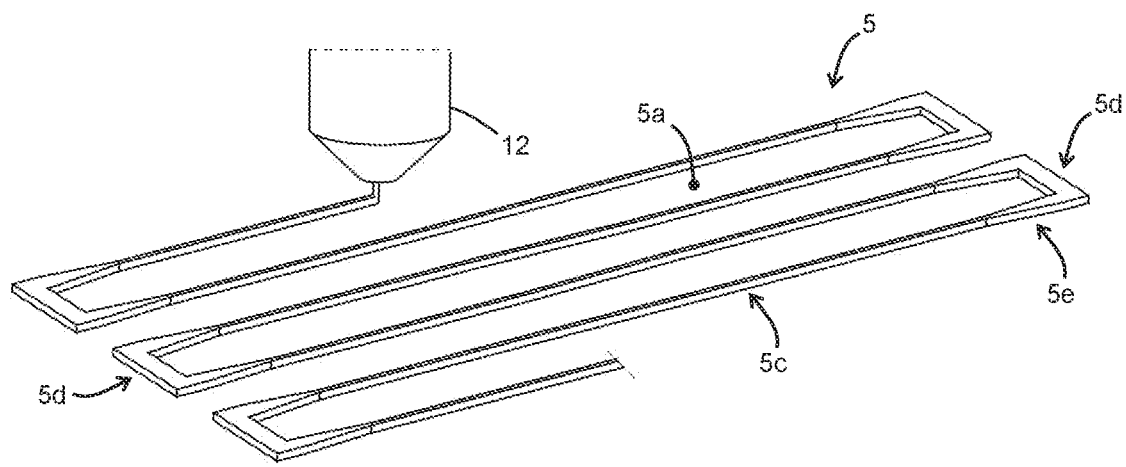
FIG. 7 is a perspective view showing that the thickness of the linear resin ejected from the nozzle 12 is continuously changed when the linear structure 5 is formed.

In the manufacturing method for the formed body 10 of the embodiment, the thickness of the linear resin ejected from the nozzle 12 can be changed. Therefore, in the manufacturing method for the formed body 10 of the embodiment, the formed body with continuously and smoothly changing elasticity (cushioning) can be formed. Also, for example, there are cases where you want to make the thickness of the linear resin forming the outer periphery of the formed body 10 thicker, and you want to make the thickness of the linear resin forming the inner part of the outer periphery of the formed body 10 thinner. Even in such a case, the manufacturing method for the formed body 10 of the embodiment has an advantageous effect. As shown in FIG. 7, when the nozzle 12 is moving in the linear part 5c, the thickness of the linear resin ejected from the nozzle 12 is thinner, and when the nozzle 12 is moving in the end part 5d, the thickness of the linear resin ejected from the nozzle 12 is thicker. Then, when the nozzle 12 is moving in the transition part 5e arranged between the linear part 5c and the end part 5d, the thickness of the linear resin ejected from the nozzle 12 is gradually thicker or thinner. As shown in FIG. 7, this allows the outer periphery of linear structure 5 (corresponding to the outer periphery of the formed body 10) can be formed harder, and the inner part of the outer periphery of the linear structure 5 can be formed softer.

For example, in the filling rate control method, the formed body can be formed hard by narrowing the arrangement interval of a pair of adjacent the linear resins, that is, by increasing the filling rate. However, if the arrangement interval of a pair of adjacent linear resins is narrowed, the moving pitch of the nozzle 12 becomes shorter, the moving time of the nozzle 12 increases, and as a result, the forming time of the formed body 10 becomes longer. In the manufacturing method for the formed body 10 of the embodiment, the elasticity (cushioning) can be made different according to each part of the formed body 10 by changing the thickness of the linear resin ejected from the nozzle 12. Therefore, in the manufacturing method for the formed body 10 of the embodiment, the formed body 10 can be formed harder by being thicker the thickness of the linear resin without narrowing the arrangement interval of the linear resin. That is, the manufacturing method for the formed body 10 of the embodiment can suppress lengthening of the forming time of the formed body 10 when the formed body 10 is formed harder.

When the same moving path data is used even if the target data is different, the manufacturing method for the formed body 10 of the embodiment has an advantageous effect. That is, the manufacturing method for the formed body 10 of the embodiment can change the elasticity (cushioning) according to each part of the formed body 10 by changing the thickness of the linear resin ejected from nozzle 12, therefore the manufacturing method can suppress the variation of the moving path data stored in the control device Cnt, and suppress the load when the control device Cnt calculates the moving path data. Therefore, the manufacturing method of the embodiment can suppress the complexity of the processing of the control device Cnt when forming the formed body 10, and as a result, the manufacturing method of the embodiment can easily automate the process of manufacturing the structure 1.

If the moving pitch when moving the nozzle 12 in two-dimensions is different between the first elastic region Rg1 and the second elastic region Rg2, it is possible to make the elasticity of the first elastic region Rg1 different from the elasticity of the second elastic region Rg2, but it becomes difficult to define the path of nozzle 12 with a single stroke. In particular, when the first elastic region Rg1 is arranged inside the second elastic region Rg2 as the formed body 10 of the embodiment, it tends to be more difficult to define the path of the nozzle 12 with a single stroke. Therefore, if the moving pitch when moving the nozzle 12 in two-dimensions is different between the first elastic region Rg1 and the second elastic region Rg2, for example, the first elastic region Rg1 and the second elastic region Rg2 need to be formed separately. If the first elastic region Rg1 and the second elastic region Rg2 are formed separately, the first elastic region Rg1 and the second elastic region Rg2 become discontinuous, thus the first elastic region Rg1 will be peeled off from the second elastic region Rg2 and the usability of the formed body (the insole) will become worse, this case will lower the quality of the formed body. Also, if the first elastic region Rg1 and the second elastic region Rg2 are formed separately, the forming time of the formed body will be longer. However, in the formed body 10 of the embodiment, the first elastic region Rg1 and the second elastic region Rg2 are connected directly. Therefore, deterioration of quality of the formed body 10 of the embodiment is suppressed, and lengthening of the forming time is suppressed.

Embodiments of Second Viewpoint

1. Structure 1

The explanation of "STRUCTURE 1" of embodiment of second viewpoint is omitted because it is similar to "1. STRUCTURE" of embodiments of first viewpoint.

1-1. Base Layer 2

The explanation of "BASE LAYER 2" of embodiment of second viewpoint is omitted because it is similar to "1-1. BASE LAYER 2" of embodiments of first viewpoint.

1-2. Covering Layer 3

The explanation of "COVERING LAYER 3" of embodiment of second viewpoint is omitted because it is similar to "1-2. COVERING LAYER 3" of embodiments of first viewpoint.

1-2-1. Formed Body 10 Etc.

The explanation of "FORMED BODY 10 (linear structures 4, 5 and first and second elastic regions Rg1, Rg2)" of embodiment of second viewpoint is omitted because it is similar to "1-2-1. LINEAR STRUCTURES 4 AND 5" and "1-2-2. FIRST and SECOND ELASTIC REGIONS Rg1 AND Rg2" of embodiments of first viewpoint.

1-2-2. Formed Body 10B

The shape of the formed body of the covering layer 3 is not limited to the above-mentioned the formed body 10. The formed body of the covering layer 3 may be the formed body 10B shown in FIG. 8. The arrangement interval of the linear resin of the first elastic region Rg1 of the formed body 10B is larger than the arrangement interval of the linear resin of the first elastic region Rg1 of the formed body 10. That is, the filling rate of the first elastic region Rg1 of the formed body 10B is smaller than the filling rate of the first elastic region Rg1 of the formed body 10. The first elastic region Rg1 of the formed body 10B is also rich in cushioning like the first elastic region Rg1 of the formed body 10. Hardness of the formed body can be changed by changing the thickness of the linear resin as in the formed body 10, or by changing the filling rate of the linear resin as in the formed body 10B.

2. About Three-Dimensional Modeling Equipment 50

Figure 9:
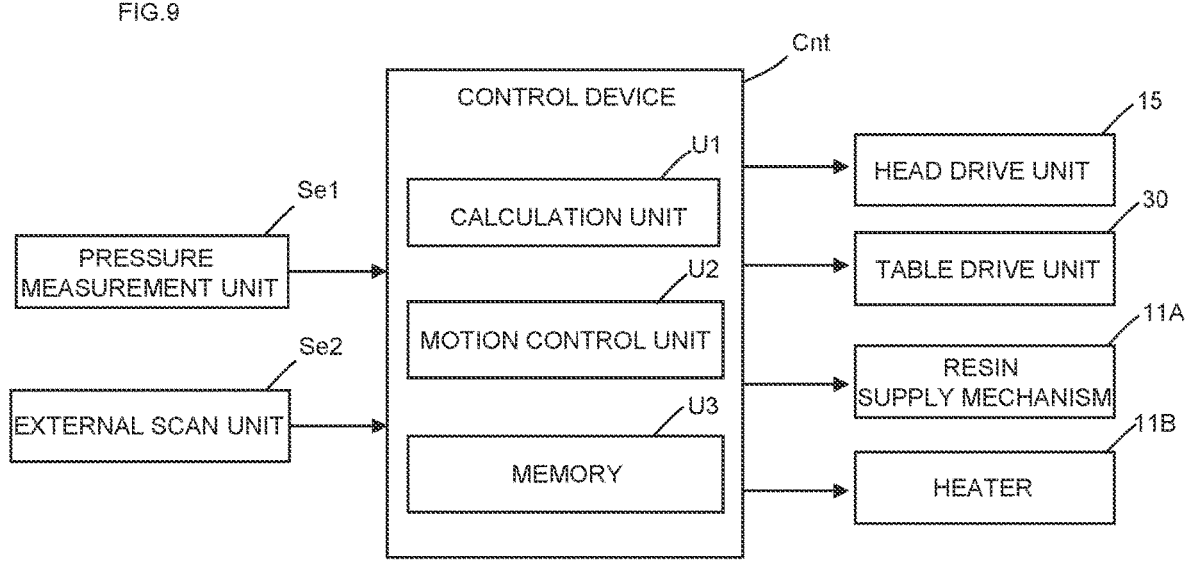
FIG. 9 is a functional block diagram of the control device Cnt that controls the three-dimensional modeling equipment 50.
Figure 10:
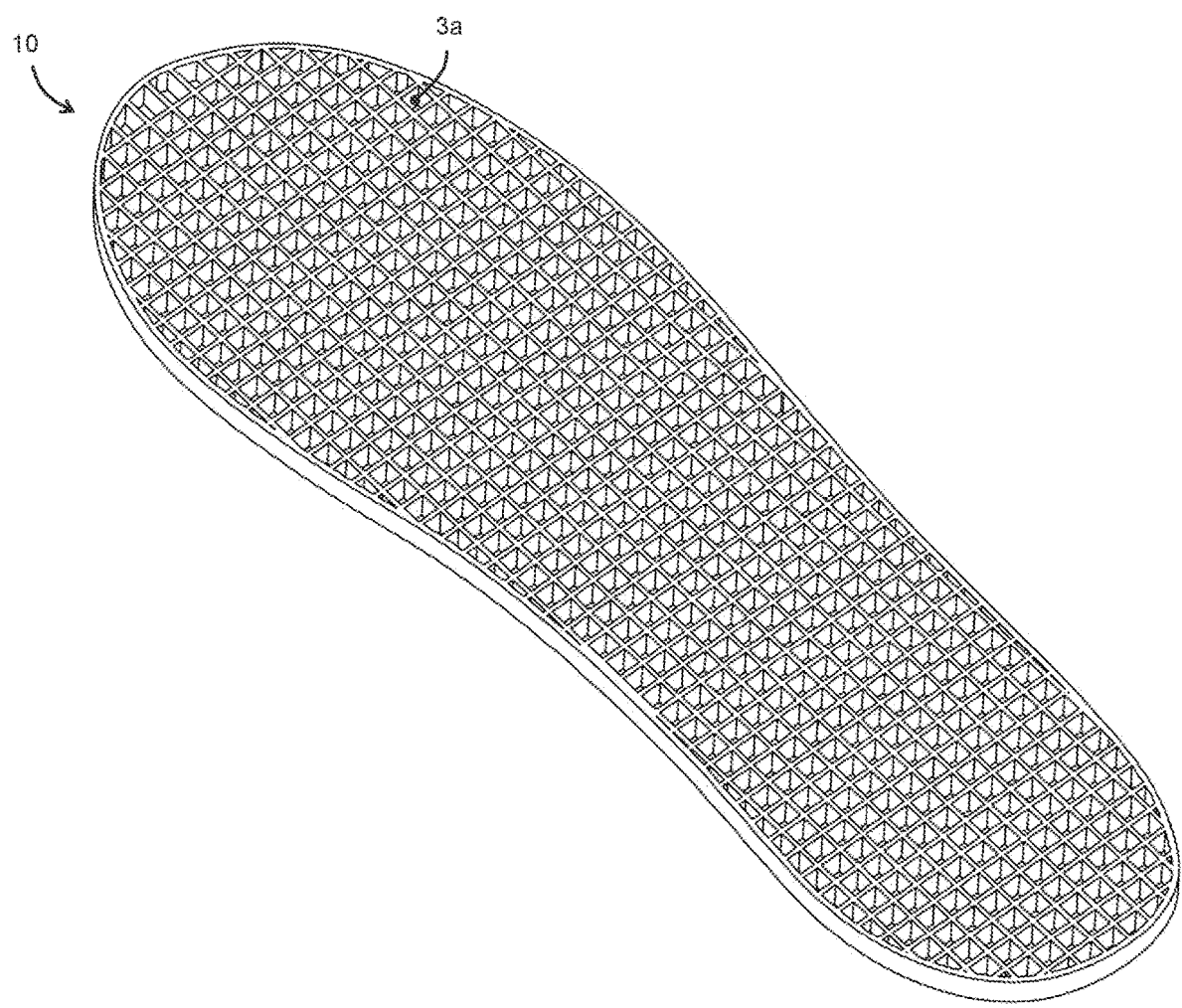
FIG. 10 is a perspective view of the formed body 10 of the covering layer 3 of the structure 1 of the embodiments.

As shown in FIG. 4A, the three-dimensional modeling equipment 50 is used as the manufacturing method for the structure 1. In addition, a system for manufacturing the structure 1 includes an acquiring part, a generating part, and a forming part. The three-dimensional modeling equipment 50 corresponds to the forming part in the system for manufacturing the structure 1. The three-dimensional modeling equipment 50 includes a head 11, a nozzle 12, a frame 20, a pair of first guide parts 21, a second guide part 22, a table drive unit 30, and a forming table 31. A wire material 14 constituted with a resin is inserted in the head 11. Although not shown in FIG. 4A, the three-dimensional modeling equipment 50 includes a first drive unit that moves the head 11 along the second guide part 22 and a second drive unit that moves the second guide part 22 along the pair of second guide parts 22. The first drive unit and the second drive unit correspond to the head drive unit 15 shown in FIG. 9. Further, as shown in FIG. 9, the three-dimensional modeling equipment 50 includes a control device Cnt that controls various actuators.

2-1. Configuration of Three-Dimensional Modeling Equipment 50

The explanation of "THREE-DIMENSIONAL MODELING EQUIPMENT 50" of embodiment of second viewpoint is omitted because it is similar to "2-1. THREE-DIMENSIONAL MODELING EQUIPMENT 50" of embodiments of first viewpoint.

2-2. Functional Block of Control Device Cnt

The Control device Cnt of the three-dimensional modeling equipment 50 acquires the target data of the target (in this Embodiment, the foot of the human body) that uses the structure 1. In the embodiment, the acquired target data is the pressure distribution data and the external shape data. The pressure distribution data is the data indicating the load applied to the target, and the external shape data is the data indicating the surface shape of the target. As shown in FIG. 9, the control device Cnt acquires the pressure distribution data from the pressure measurement unit Se1. In addition, the control device Cnt acquires the external shape data from the external shape scanning unit Se2. The pressure measurement unit Se1 and the external shape scanning unit Se2 correspond to the acquiring part in the system for manufacturing the structure 1.

As shown in FIG. 9, the control device Cnt includes a calculation unit U1, a motion control unit U2, and a memory U3. The calculation unit U1 of the control device Cnt corresponds to the generating part in the system for manufacturing the structure 1. The calculation unit U1 generates the forming data for forming the formed body 10 based on the acquired target data. This forming data includes the moving path data and the thickness data. In addition, the motion control unit U2 controls the head drive unit 15, the table drive unit 30, the resin supply mechanism 11A, and the heater 11B. The memory U3 stores various data such as the forming data.

In the embodiment of second viewpoint, each functional part, the moving path data, and the thickness data included in the control device Cnt are omitted because it is similar to 2-2. Functional Block of Control Device Cnt of Embodiments of First VIEWPOINT. Also, in the embodiment of second viewpoint, the technics for changing the thickness of the linear resin ejected from the nozzle 12 can be adopted the technics explained in 2-2. FUNCTIONAL BLOCK OF CONTROL DEVICE Cnt of EMBODIMENTS OF FIRST VIEWPOINT.

3. Manufacturing Method for Structure 1

The manufacturing method for the structure 1 of the embodiment includes an acquiring step, a generating step, and a forming step.

3-1. Acquiring Step

In the acquiring step, the control device Cnt acquires the pressure distribution data from the pressure measuring unit Se1 and the external shape data from the external shape scanning unit Se2. In the embodiment, although the case where the control device Cnt acquires the external shape data in addition to the pressure distribution data is described, the control device Cnt may not acquire the external shape data.

3-2. Generating Step

In the generating step, the calculation unit U1 of the control device Cnt generates the forming data of the formed bodies 10 and 10B based on the target data. This generated forming data includes the moving path data and the thickness data as described above. In the generating step, the calculation unit U1 generates the forming data of the formed bodies 10 and 10B based on the pressure distribution data and the external shape data. Here, in the control device Cnt, a program that can determine the suitable insole shape for the user's foot based on the pressure distribution of the target and the outer shape of the target is stored. The calculation unit U1 generates the forming data of the formed bodies 10 and 10B based on algorithm of this program. The algorithm of this program can set the region of the pressure distribution data where the pressure is higher than the predetermined pressure value to the first elastic region Rg1. In addition, the algorithm of this program may set the filling rate of the linear resin of the entire formed body to be constant and the filling rate of the linear resin to be low when the variation of the pressure value of the pressure distribution data is lower than the predetermined value, and the average value of the pressure values of the pressure distribution data is lower than the predetermined pressure value. In this way, the algorithm of the program can be determined based on properties of the target and use's requests.

In the embodiment, the moving path data defines the path of the nozzle 12 when moving the nozzle 12. In addition, the moving path data defines the range of the first and second elastic regions Rg1 and Rg2. The thickness data related to this moving path data defines the control data of the resin supply mechanism 11A in the first elastic region Rg1 (a sending amount of the wire material 14) and the control data of the resin supply mechanism 11A in the second elastic region Rg2 (a sending amount of the wire material 14). The sending amount of the wire material 14 refers to the amount of the wire material 14 sent by the resin supply mechanism 11A to the nozzle 12 per unit time.

3-3. Forming Step

Figure 8:
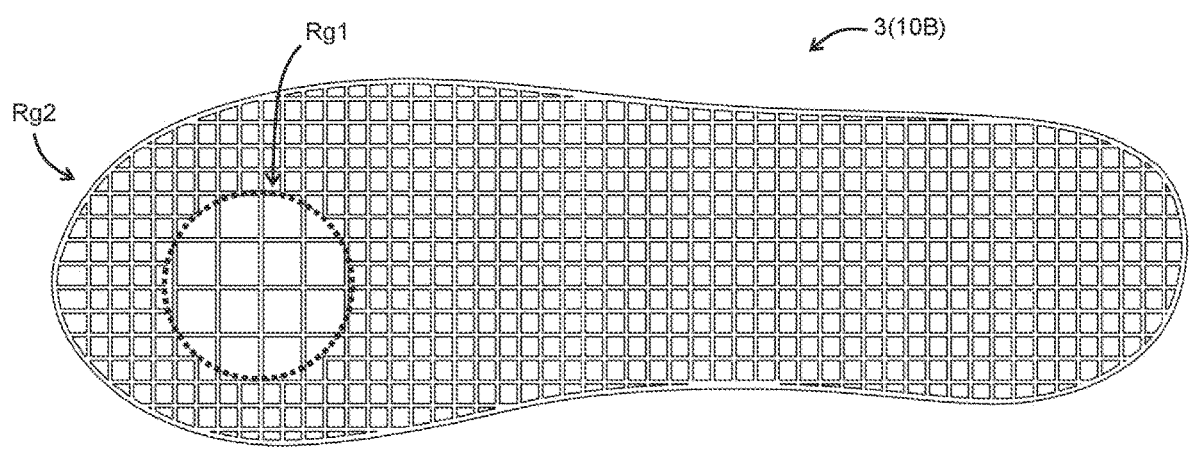
FIG. 8 is a top view of the formed body 10B in which the arrangement interval of the linear resin is larger than the arrangement interval of the linear resin of the formed body 10 shown in FIGS. 3A and 3B.

In the forming step, the motion control unit U2 of the control device Cnt controls the head drive unit 15, the table drive unit 30 and the resin supply mechanism 11A based on the forming data. In the forming step, the base layer 2 formed in advance is placed on the forming table 31. The base layer 2 can also be formed in the forming step. In this forming step, the structure 1 is formed so that flexibility (cushioning) of the structure 1 changes based on the forming data generated in the generating step. The flexibility (cushioning) of the structure 1 can be changed by adjusting the thickness of the linear resin (see FIG. 3B) and the pitch of the linear resin (see FIG. 8). In addition, although the configuration of FIG. 3B and the configuration of FIG. 8 are independent, the structure 1 of the embodiment may be included both the configuration of the first elastic region Rg1 of FIG. 3B and the configuration of the first elastic region Rg1 of FIG. 8.

Moreover, in the embodiment, the linear resin forming the linear structures 4 and 5 of the formed body 10 is formed of one linear resin. That is, the path of the nozzle 12 when moving the nozzle 12 in two-dimensions is a single stroke. The shapes of the linear resins 4b and 5b shown in FIGS. 2A and 2B correspond to the paths of the nozzle 12 when forming the linear structure 4 and 5 in the forming step.

In the forming step of the formed body 10, when the motion control unit U2 controls the head drive unit 15, the table drive unit 30 and the resin supply mechanism 11A based on the forming data, each configuration operates as follows. That is, when the nozzle 12 passes through the part belonging to the second elastic region Rg2 in the path of the nozzle 12, the resin supply mechanism 11A operates so that the sending amount of the wire material 14 increases. Also, when the nozzle 12 passes through the part belonging to the first elastic region Rg1 in the path of the nozzle 12, the resin supply mechanism 11A operates so that the sending amount of the wire material 14 decreases. As a result, the thickness of the linear resin forming the first elastic region Rg1 becomes thinner than the thickness of the linear resin forming the second elastic region Rg2. Also, the first elastic region Rg1 of the formed body 10B is different from the first elastic region Rg1 of the formed body 10, and a part of the linear resin of the first elastic region Rg1 of the formed body 10B is interrupted. It is better not to eject the linear resin from the nozzle 12 when the nozzle 12 is moving the interrupted part. Further, the moving path of the nozzle 12 may be set to bypass the interrupted part so that the nozzle 12 does not move the interrupted part.

When the motion control unit U2 finishes moving the nozzle 12 that passes the path corresponding to one of the shapes of the linear resin 4b and 5b, the motion control unit U2 controls the table drive unit 30 to move the forming table 31 downward. Then, after the motion control unit U2 moves the nozzle 12 that passes the path corresponding to the other shape of the linear resin 4b and 5b, the motion control unit U2 controls the table drive unit 30 to move the forming table 31 downward. In this way, by repeating the movement of the nozzle 12 and the forming table 31, the formed body 10 is formed on the base layer 2, and as a result, the three-dimensional modeling equipment 50 can form the structure 1.

4. Effect of Embodiment

The manufacturing method of the embodiment and the system of the embodiment form the structure based on the forming data generated based on the pressure distribution data. That is, the manufacturing method of the embodiment and the system of the embodiment form the structure by considering the pressure distribution indicating the load applied to the target formed, so that the usability of the structure can be improved.

In the generating step, the manufacturing method of the embodiment changes the moving path data or the thickness data according to the pressure distribution data. Also, in the generating part (calculation unit U1), the system of the embodiment changes the moving path data or the thickness data according to the pressure distribution data. By changing the moving path data, the filling rate of the linear resin can be changed, and as a result, the elasticity (cushioning) of the formed body can be changed. Also, the elasticity (cushioning) of the formed body can be changed by changing the thickness data. Therefore, the manufacturing method of the embodiment and the system of the embodiment can change the elasticity (cushioning) of the formed body by a plurality of methods, that is, the method of changing the filling rate and the method of changing the thickness of the linear resin. Thus, the manufacturing method of the embodiment and the system of the embodiment can form the structure 1 according to properties of the target and the user's request, and as a result, and can improve the usability of the structure 1.

The manufacturing method and the system of the embodiment can change the thickness of the linear resin according to a part of the formed body (see FIGS. 3A and 3B) and can change the filling rate of the linear resin according to a part of the formed body (see FIG. 8). Thus, the manufacturing method and the system of the embodiment can form the formed body with different elasticity (cushioning) according to a part of the formed body such as the formed body 10. Therefore, the manufacturing method and the system of the embodiment can further improve the usability of the structure 1.

In the generating step, the manufacturing method of the embodiment generates the forming data based on the pressure distribution data and the external shape data. Also, in the generating part (calculation unit U1), the system of the embodiment generates the forming data based on the pressure distribution data and the external shape data. That is, the control device Cnt generates the forming data by considering not only the pressure distribution of the target but also the external shape of the target. Thus, the manufacturing method and the system of the embodiment can form the formed body with a shape suitable for the target and a hardness suitable for the target. As a result, the manufacturing method and the system of the embodiment can further improve the usability of the structure 1.

Embodiments of Third Viewpoint

1. Configuration of Structure 1

The explanation of "CONFIGURATION OF STRUCTURE 1" of embodiment of third viewpoint is omitted because it is similar to "1. STRUCTURE" of embodiments of first viewpoint.

1-1. Base Layer 2

The base layer 2 is the layer on which the covering layer 3 is formed, and the base layer 2 and the covering layer 3 are in close contact with each other. The base layer 2 is formed of the foam, and the foam in the base layer 2 includes bubbles in which the resin forming the covering layer 3 penetrates. The base layer 2 can be formed of the foam including a large number of bubbles, and can also be formed of a sponge body including a large number of the bubbles. The resin material forming the base layer 2 is not particularly limited. The bubble structure of the base layer 2 may be an open cell structure or a closed cell structure. The open cell structure is easier for the resin to penetrate deeper than the closed cell structure, and the closed cell structure is easier to increase strength than the open cell structure.

1-2. Covering Layer 3

Figure 2C:
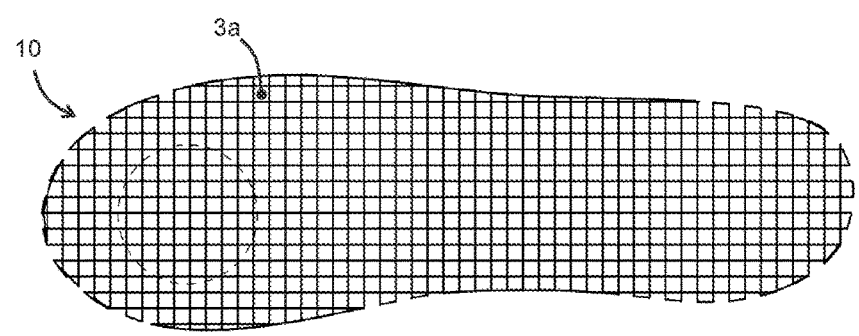
FIG. 2C is a schematic view of the formed body 10 formed by alternately laminating the linear structure 4 and the linear structure 5.

The covering layer 3 covers at least a part of the base layer 2. The covering layer 3 is made of the resin material different from the resin material forming the base layer 2. The covering layer 3 includes the formed body 10 and an impregnated layer 6. As shown in FIGS. 2A to 2C, the formed body 10 is formed by laminating two types of the linear structures (linear structures 4, 5).

1-2-1. Linear Structures 4 and 5

The explanation of "LINEAR STRUCTURES 4 AND 5" of embodiment of third viewpoint is omitted because it is similar to "1-2-1. LINEAR STRUCTURES 4 AND 5" of first viewpoint.

1-2-2. Impregnated Layer 6

The resin forming the impregnated layer 6 is impregnated in the base layer 2. Specifically, in this embodiment, since the base layer 2 is the foam, the resin forming the impregnated layer 6 penetrates in the bubbles of the foam of the base layer 2. Thus, by impregnating the base layer 2 with the resin forming the impregnated layer 6, the resin forming the impregnated layer 6 is entangled with the foam forming the base layer 2. As a result, the impregnated layer 6 bonds to the base layer 2 strongly. In addition, the formed body 10 (linear structures 4 and 5) is formed on the impregnated layer 6, since the resin material forming the impregnated layer 6 and the resin material forming the formed body 10 are the same, the impregnated layer 6 and the formed body 10 are bonded strongly. Therefore, since the resin forming the impregnated layer 6 is impregnated in the base layer 2, it is suppressed that the covering layer 3 is peeled off from the base layer 2. In the embodiment, although the position of the surface of the impregnated layer 6 and the position of the surface of the base layer 2 are almost the same, the surface of the impregnated layer 6 may protrude from the surface of the base layer 2.

2. Manufacturing Method for Structure 1

The manufacturing method for the structure 1 of the embodiment includes the impregnated layer forming step and a linear structure forming step. The three-dimensional modeling equipment of the manufacturing method for the structure 1 of the embodiment includes a nozzle 12, a heating unit (not shown), and a resin supply unit (not shown). The nozzle 12 includes a function of linearizing the resin supplied from the resin supply unit. The heating unit is attached to such as the nozzle 12, and the resin supplied to the nozzle 12 is softened by heat of the heating unit.

Impregnated Layer Forming Step

Figure 11A:
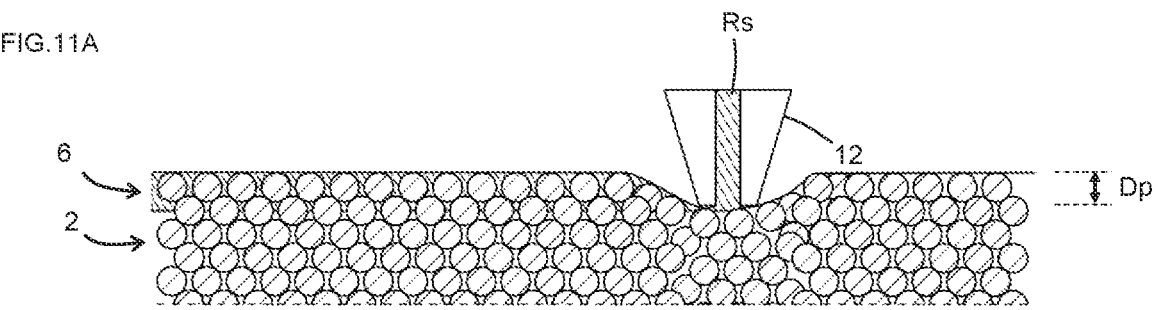
FIG. 11A is an explanatory diagram of an impregnated layer forming step.

As shown in FIG. 11A, in the impregnated layer forming step, the nozzle 12 ejecting the linear resin Rs is pushed on the base layer 2, and the nozzle 12 ejects the linear resin Rs into the base layer 2. The linear resin Rs corresponds to the linear resin 4b or the linear resin 5b shown in FIGS. 2A to 2C. Since the nozzle 12 is pushed on the base layer 2, contact force between a tip surface of the nozzle 12 and the surface of the base layer 2 increases. As a result, the linear resin Rs ejected from the nozzle 12 is difficult to escape between the tip surface of the nozzle 12 and the surface of the base layer 2, and the pressure of the linear resin Rs ejected from the nozzle 12 increases. This makes it easier for the linear resin Rs ejected from the nozzle 12 to penetrate the base layer 2. The linear resin Rs penetrated the base layer 2 solidify in the base layer 2 after being cooled, and becomes an impregnated layer 6. Here, in the embodiment, since the base layer 2 is formed of the foam, a large number of bubbles are included in the base layer 2. Thus, in the embodiment, the linear resin Rs ejected from the nozzle 12 penetrates the bubbles of the base layer 2, and the linear resin Rs are entangled with the foam forming the base layer 2. That is, an anchor effect occurs in the impregnated layer 6 and the base layer 2. Therefore, in the embodiment, since the impregnated layer 6 is strongly bonded to the base layer 2 by occurring the anchor effect, and bonding strength between the impregnated layer 6 and the base layer 2 is improved.

In the impregnated layer forming step, the nozzle 12 is two-dimensionally moved. Specifically, the two-dimensional moving range of the nozzle 12 in the impregnated layer forming step is determined according to the shape of the linear structure Bd located in the bottom layer of the formed body 10. The linear structure Bd corresponds to the linear structure 4 or the linear structure 5 shown in FIGS. 2A to 2C. For example, if the linear structure Bd located in the bottom layer of the formed body 10 is the linear structure 4, the linear structure Bd located in the layer one above the bottom layer in which the linear structure Bd is located is the linear structure 5.

In the embodiment, it is preferable that the two-dimensional moving range of the nozzle 12 in the impregnated layer forming step (hereinafter referred to as the first range) is the same as the two-dimensional moving range of the nozzle 12 in the linear structure Bd located in the bottom layer of the formed body 10 (hereinafter referred to as the second range), or is wider than the second range so as to include the whole of the second range. As a result, the whole of the lower part of the formed body 10 is formed on the impregnated layer 6, and the formed body 10 is more reliably prevented from being peeled off from the base layer 2.

Further, the second range may be extended beyond the first range. The extended part has lower bonding strength between the covering layer 3 and the base layer 2 than the non-extended part. However, in the non-extended part, the bonding strength between the covering layer 3 and the base layer 2 is high, it is suppressed that the covering layer 3 is peeled off from the base layer 2.

Further, the path of the nozzle 12 when forming the impregnated layer 6 may be the same as the path of the nozzle 12 when forming the linear structure Bd located in the bottom layer of the formed body 10. This prevents the first area of the base layer 2 from being covered by the impregnated layer 6 and prevents the ventilation between the holes 3a in the covering layer 3 and the bubbles in the base layer 2 from being blocked by the impregnated layer 6. As a result, ventilation performance of the structure 1 is improved.

As shown in FIG. 11A, in the impregnated layer forming step, a pushing amount Dp that the nozzle 12 is pushed on the base layer 2 is equal to or larger than a thickness of the linear resin Rs. In the embodiment, the thickness of the linear resin Rs is the same as the laminating pitch of the linear structure Bd. Thus, by setting the pushing amount Dp that the nozzle 12 is pushed on the base layer 2 to be equal to or larger than the thickness of the linear resin Rs, the linear resin Rs ejected from the nozzle 12 becomes more difficult to escape between the tip surface of the nozzle 12 and the surface of the base layer 2. This not only makes it easier for the linear resin Rs ejected from the nozzle 12 to penetrate the base layer 2, but also the linear resin Rs ejected from the nozzle 12 to penetrate the base layer 2 deeply. Therefore, the anchor effect is strengthened, and the impregnated layer 6 is more strongly bonded to the base layer 2.

Also, in the impregnated layer forming step, if the nozzle 12 is pushed too much on the base layer 2, the resin penetrated the base layer 2 may spread too much horizontally. Here, in the impregnated layer forming step, since the nozzle 12 moves on the base layer 2 in two-dimensions, so if the resin penetrated the base layer 2 spreads horizontally, adjacent resins of two-dimensional moving paths may come into contact with each other. If the adjacent resins of the two-dimensional moving paths come into contact with each other, the first range of the base layer 2 is covered with the impregnated layer 6, and as a result, the ventilation performance of the structure 1 is reduced. Therefore, it is preferable to determine the pushing amount Dp that the nozzle 12 is pushed on the base layer 2 in the impregnated layer forming step and the two-dimensional moving path of the nozzle 12 in the impregnated layer forming step so that the adjacent resins of the two-dimensional moving paths do not come into contact with each other.

Linear Structure Forming Step

Figure 11B:
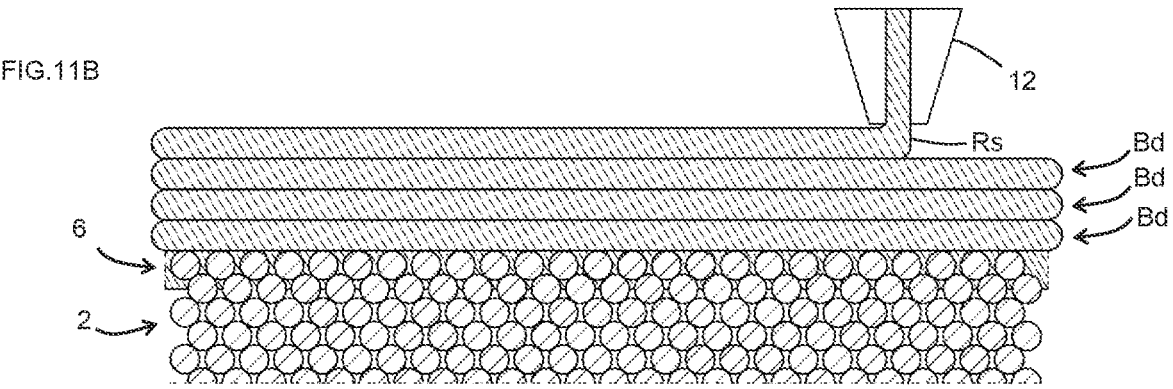
FIG. 11B is an explanatory diagram of a linear structure forming step.

As shown in FIG. 11B, in the linear structure forming step, the linear structure Bd is formed by ejecting the linear resin Rs from the nozzle 12 while moving the nozzle 12 in two-dimensions. Each linear resin Rs forming each linear structure Bd is formed of one linear resin. That is, the path of the nozzle 12 when moving the nozzle 12 in two-dimensions is a single stroke. Therefore, the manufacturing method for the structure 1 of the embodiment can form efficiently the covering layer 3.

3. Effect of Embodiment

In the conventional manufacturing method, the linear resin is ejected from the nozzle on the base layer with the nozzle's being spaced from the base layer. Therefore, in the conventional manufacturing method, it is difficult for the resin ejected from the nozzle to penetrate the base layer, as a result, the anchor effect cannot be occurred. However, in the structure 1 of the embodiment, the linear resin Rs ejected from the nozzle 12 penetrates the bubbles in the base layer 2 by the nozzle 12 is pushed on the base layer 2, and the resin penetrated the bubbles solidifies. The resin that solidifies and becomes the impregnated layer 6 is entangled with the foam forming the base layer 2, and the anchor effect occurs in the impregnated layer 6 and the base layer 2. The impregnated layer 6 is strongly bonded to the base layer 2 by occurring the anchor effect, and bonding strength between the impregnated layer 6 and the base layer 2 is improved.

The Three-dimensional modeling equipment can form the structures of various shapes, but the formation time of one structure by the manufacturing method using this is longer than the formation time of one structure by the manufacturing method using a mold (for example, the manufacturing method by injection molding). Therefore, it is conceivable to form the base layer 2 by the injection molding in advance and to form the formed body 10 on the base layer 2 by the three-dimensional modeling equipment. Here, when the resin material forming the base layer 2 and the resin material forming the formed body 10 are the same, it is easy for this technic to bring the base layer 2 and the formed body 10 into close contact with each other. However, there are cases where the resin material forming the base layer 2 and the resin material forming the formed body 10 are different, such as the shoe insoles described in the embodiment. In such a case, it is difficult to bring the base layer 2 and the formed body 10 into close contact with each other. Therefore, it is preferable to apply the manufacturing method of the embodiment to the base layer 2 manufactured by the injection molding in advance. As a result, even if the resin material forming the base layer 2 and the resin material forming the formed body 10 are different, it is possible to efficiently manufacture structures including various shapes that are difficult to manufacture by the injection molding, etc.

Embodiment of Fourth Viewpoint

1. First Embodiment of Fourth Viewpoint
1-1. Configuration of Structure 1

The explanation of "CONFIGURATION OF STRUCTURE 1" of the embodiment of fourth viewpoint is omitted because it is similar to "1. STRUCTURE" of embodiments of first viewpoint.

1-1-1. Base Layer 2

The base layer 2 is formed of a shape memory material including a shape memory polymer. The shape memory material includes a shape memory property and includes a property of returning to an original shape by elasticity when heated to a predetermined recovery temperature or higher. The shape memory material preferably includes only the shape memory polymer, but may include other components as long as the shape memory property is not impaired. The components other than the shape memory polymer are resins such as polyolefins such as polyethylene and polypropylene, and fillers. For example, the proportion of the shape memory polymer in the shape memory material is 50 to 100% by mass, specifically, 50, 55, 60, 65, 70, 75, 80, 85, 90, 95, 100% by mass. The proportion of the shape memory polymer may be within the range between any two of the values shown here. The recovery temperature of the shape memory material matches the glass-transition temperature of the shape memory polymer.

The shape memory polymer includes the property of returning to the original shape by the elasticity when heated over Tg. For example, Tg is 35 to 100 degrees Celsius, preferably 40 to 75 degrees Celsius, specifically, 35, 40, 45, 50, 55, 60, 65, 70, 75, 80, 85, 90, 95, 100 degrees Celsius, and Tg may be within the range between any two of the values shown here.

When an external force is applied at temperature over Tg to shape the secondary shape and the temperature is cooled to less than Tg while the external force is applied, the secondary shape is fixed. At temperatures below Tg, the original shape is not returned even when the external force is not applied. On the other hand, when the shape memory polymer with the secondary shape is heated to the temperature over Tg and no external force is applied, the original shape is returned by elasticity. For example, the original shape can be formed by melting the shape memory polymer and shaping it into a desired shape. The shape memory polymer is a polymer including rubber elasticity, for example, polynorbornene, trans polyisoprene, styrene-butadiene copolymer, polyurethane and the like.

The shape memory polymer and the shape memory material including it includes the property that the elastic modulus changes significantly in the vicinity of Tg. For example, the elastic modulus at (Tg−20 degrees Celsius)/elastic modulus at (Tg+20 degrees Celsius) is 10 or more. In this case, the elastic modulus at (Tg−20 degrees Celsius) is 10 times or more the elastic modulus at (Tg+20 degrees Celsius), thus, the structure 1 is transformed at temperature of (Tg+20 degrees Celsius) or higher, and the structure 1 can be used at temperatures below (Tg−20 degrees Celsius). Therefore, the shape of the structure can be easily transformed into the shape set for each user, and the shape can be maintained during use. For example, the value of elastic modulus at (Tg−20 degrees Celsius)/elastic modulus at (Tg+20 degrees Celsius) is 10 to 1000, specifically 10, 20, 30, 40, 50, 60, 70, 80, 90, 100, 200, 300, 400, 500, 1000, and the value may be within the range between any two of the values shown here.

Also, in a semi-logarithmic graph where the x-axis representing temperature (degrees Celsius) is a normal scale and the y-axis representing elastic modulus (Pa) is a logarithmic scale, the value of slope of the graph at Tg is −1 to −0.025, preferably −0.5 to −0.1. Specifically, the value of this slope is −1, −0.9, −0.8, −0.7, −0.6, −0.5, −0.4, −0.3, −0.2, −0.1, −0.075, −0.050, −0.025, and the value may be within the range between any two of the values shown here. The slope value of −1 means that the elastic modulus increases 10 times when the temperature drops by 1 degrees Celsius, and the slope value of −0.025 means that the elastic modulus increases 10 times when the temperature drops by 40 degrees Celsius.

In other words, when the elastic modulus increases 10 times or more due to the temperature change from Tg+X degrees Celsius to Tg-X degrees Celsius, X is preferably 20 or less, for example 0.5 to 20, specifically 0.5, 1, 2, 3, 4, 5, 6, 7, 8, 9, 10, 11, 12, 13, 14, 15, 16, 17, 18, 19, 20. And X may be within the range between any two of the values shown here.

In the present specification, the elastic modulus means a storage elastic modulus obtained by a dynamic viscoelasticity test, and can be measured according to JIS K7244.

Even if the base layer 2 is formed of a thermoplastic resin other than the shape memory material, it is possible to reduce the elastic modulus of the base layer as the temperature rises. However, for the thermoplastic resins other than the shape memory materials, since its elastic modulus decreases slowly as the temperature rises, it is not easy to carry out a series of processes in which the base layer 2 is heated and transformed and then lowered to maintain the transformed shape. Therefore, the base layer 2 needs to be formed of the shape memory material.

1-1-2. Covering Layer 3

The covering layer 3 covers at least a part of the base layer 2. The covering layer 3 is formed of a soft material. The soft material is a material that can be easily elastically transformed at room temperature, and corresponds to elastomers with Tg below room temperature. Examples of the elastomer include styrene-based elastomers. The Tg of the soft material is preferably 20 degrees Celsius or lower, more preferably 10 degrees Celsius or lower, and even more preferably 0 degree Celsius or lower. The soft material is preferably softer than the shape memory material at room temperature (25 degrees Celsius) and preferably has a lower elastic modulus than the shape memory material at room temperature. Since the base layer 2 is highly rigid at room temperature, there is a risk of causing pain to the user when the base layer 2 is pressed by the user. Therefore, in this embodiment, the usability of the structure 1 is improved by covering the base layer 2 with the covering layer 3 formed of the soft material in the part of contact with the user 1-2. Manufacturing Method for Structure 1

The manufacturing method for the structure 1 is not particularly limited, and can be formed by a method such as injection molding or three-dimensional printer forming. In the case of the injection molding, the base layer 2 and the covering layer 3 can be integrally molded by two-color molding using the shape memory material and the soft material. Further, after either one of the base layer 2 and the covering layer 3 may be formed by the injection molding, the other layer may be formed by the three-dimensional printer forming. In addition, both base layer 2 and covering layer 3 may be formed by the three-dimensional printer forming. In the three-dimensional printer forming, since the structure 1 can be formed so that it has a shape set for each user, it is preferable to form at least one of the base layer 2 and the covering layer 3 by the three-dimensional printer forming.

In the three-dimensional printer forming, as shown in FIGS. 2A to 2B, the linear structures 4 and 5 are formed by two-dimensional moving the linear resin formed by ejecting the molten resin from the head, and the formed body is formed by laminating the linear structures 4 and 5. The resin may be supplied to the head in the form of filaments or pellets. In the latter case, even the soft materials that are difficult to form filaments can be made into the linear resin.

The linear structures 4 and 5 are formed by two-dimensional moving of the linear resins 4b and 5b so as to be a single stroke. The linear structure 4 is formed by moving the linear resin 4b mainly in the horizontal direction, and the linear structure 5 is formed by moving the linear resin 5b mainly in the vertical direction. By alternately laminating the linear structures 4 and 5, the formed body 10 including grid patterns in a plan view is formed as shown in FIG. 2C.

If the linear resin is made of the shape memory material, the base layer 2 is formed as the formed body 10. On the other hand, if the linear resin is the soft material, the covering layer 3 is formed as the formed body 10.

As shown in FIGS. 2A to 2C, each of the linear structures 4 and 5 has a plurality of grooves 4a and 5a extending parallel to one another. The groove 4a is formed by the linear resin 4b forming the linear structure 4 extending in parallel. The groove 5a is formed by the linear resin 5b forming the linear structure 5 extending in parallel. Further, the grooves 4a included in one of the two linear structures 4 and 5 adjacent to each other in the laminating direction intersects the groove 5a included in the other. In this embodiment, although the grooves 4a and 5a are orthogonal to each other, the grooves 4a and 5a may intersect at an angle other than a right angle. The formed body with such a structure is relatively lightweight because of including the internal space. In addition, when the formed body is the covering layer 3, the covering layer 3 is easily transformed because there is a space inside the covering layer 3, as a result, the cushioning of the covering layer 3 is improved.

The physical properties of the formed body can be changed as appropriate by changing the two-dimensional shape of the linear structures 4 and 5 and the diameter and the density (number of pieces per unit area) of the linear resins 4b and 5b forming the linear structures 4 and 5. For example, for the covering layer 3, the covering layer 3 can be formed more flexible by reducing the diameter of the linear resins 4b and 5b and reducing the density of the linear resins 4b and 5b. In addition, as shown in FIGS. 2A to 2B, although the densities and the patterns of the linear resins 4b and 5b are uniform throughout the linear structures 4 and 5, the physical properties of the formed body can be changed by partially changing the densities and patterns of the linear resins 4b and 5b. Therefore, when the base layer 2 and the covering layer 3 are formed by the three-dimensional printer forming, it is possible to appropriately change the physical properties of the structure 1 according to the user's requests.

When both the base layer 2 and the covering layer 3 are formed by the three-dimensional printer forming, the base layer 2 may be formed in first, and the covering layer 3 may be formed using the base layer 2 as a base. Also, the covering layer 3 may be formed in first, and the base layer 2 may be formed using the covering layer 3 as a base. As shown in examples of the embodiment described later, the former is preferable because bonding strength between the base layer 2 and the covering layer 3 is improved.

By the way, when the base layer 2 is formed using the covering layer 3 as a base, the bonding strength between the base layer 2 and the covering layer 3 can be improved by raising the temperature of the linear resin when forming the base layer 2. On the other hand, since the shape memory material may deteriorate easily at high temperatures, it is desirable that the temperature of the linear resin when forming the base layer 2 be as low as possible. Therefore, by making the temperature of the linear resin when forming the bottom layer of the base layer 2 higher than the average temperature of the linear resin when forming the remaining layers of base layer 2, deterioration of the shape memory material can be suppressed while improving bonding strength.

2. Second Embodiment of Fourth Viewpoint

Figure 12:
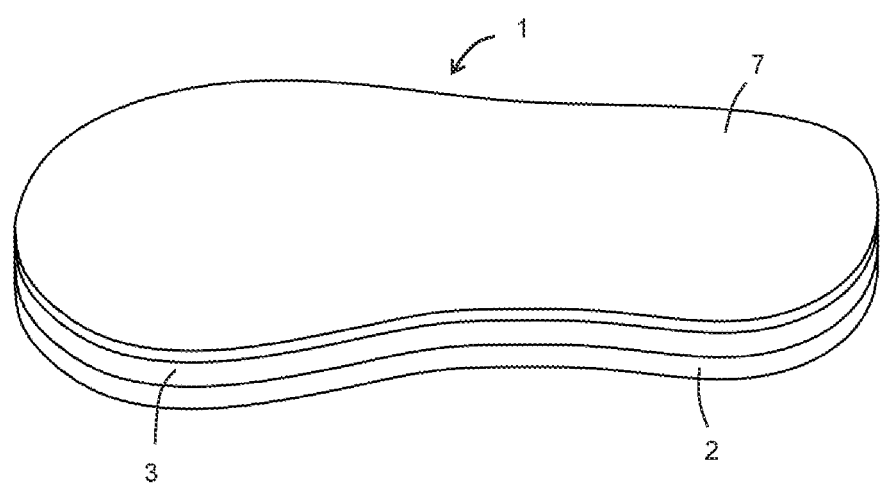
FIG. 12 is a perspective view of the structure 1 of the second embodiment of the fourth viewpoint of the present invention.

The second embodiment of the present invention will be described with reference to FIG. 12. This embodiment is similar to the first embodiment, the main difference is that it includes a skin material 7. Hereinafter, the differences will be mainly described.

The skin material 7 is formed on the covering layer 3. The skin material 7 is formed of non-woven fabric and the like. The skin material 7 may be attached to the covering layer 3 after forming a structure in which the base layer 2 and the covering layer 3 are laminated, and the coating layer 3 and the base layer 2 may be formed on the skin material 7 as a base by using the three-dimensional printer forming in this order. The latter case is preferable because there is no need to attach the skin material 7, and bonding strength between the skin material 7 and covering layer 3 becomes higher.

EXAMPLES

The structure 1 is manufactured by using the three-dimensional printer forming using the shape memory material and the soft material. A shape memory polymer made of polyurethane (manufactured by SMP Technologies, grade name: MM5520, optimum modeling temperature: 215 degrees Celsius, Tg: 55 degrees Celsius) is used as the shape memory material forming the base layer 2. A styrene-based thermoplastic elastomer (manufactured by Kuraray, grade name: Arneston JS20N, optimum forming temperature: 238 degrees Celsius) is used as a soft material for forming the covering layer 3. A PET non-woven fabric is used as an skin material 7. The "forming temperature" in the following explanation is the set temperature of the head that ejects the linear resin during forming.

3-1. Example 1

The base layer 2 is formed at a forming temperature of 215 degrees Celsius, and the covering layer 3 is formed at the forming temperature of 238 degrees Celsius using the base layer 2 as a base. The bond strength between the base layer 2 and the covering layer 3 is strong.

3-2. Example 2

The covering layer 3 is formed at a forming temperature of 238 degrees Celsius using the skin material 7 as a base, and the base layer 2 is formed at a forming temperature of 215 degrees Celsius using the covering layer 3 as a base. The bond strength between the skin material 7 and the covering layer 3 is strong. The bond strength between the covering layer 3 and the base layer 2 is weak.

3-3. Example 3

The covering layer 3 is formed at a forming temperature of 238 degrees Celsius using the skin material 7 as a base, and the base layer 2 is formed using the covering layer 3 as a base. The forming temperature when forming the bottom layer of the base layer 2 is set to 238 degrees Celsius, and the forming temperature when forming the remaining layers is set to 215 degrees Celsius. The bond strength between the skin material 7 and the covering layer 3 and the bond strength between the covering layer 3 and the base layer 2 are both strong.

DESCRIPTION OF REFERENCE SIGNS

1: structure
2: base layer
3: covering layer
3a: hole
4: linear structure
4a: groove
4b: linear resin
4c: linear part
5: linear structure
5a: groove
5c: linear part
5d: end part
5e: transition part
6: impregnated layer
7: skin material
10: formed body
10B: formed body
11: head
11A: resin supply mechanism
11A1: gear mechanism
11B: heater
12: nozzle
14: wire material
15: head drive unit
20: frame
21: first guide part
22: second guide part
30: table drive unit
31: forming table
50: three-dimensional modeling equipment
Bd: linear structure
Cnt: control device
D1: first direction
D2: second direction
Dp: pushing amount
P1: coordinate
P2: coordinate
Pt1: pitch
Pt2: pitch
Rg1: first elastic region
Rg2: second elastic region
Rs: linear resin
Se1: pressure measurement unit
Se2: external shape scanning unit
Tg: glass-transition temperature
U1: calculation unit
U2: motion control part
U3: memory

The invention claimed is:

1. A structure comprising:
a base layer; and
a covering layer formed at a forming temperature of 238 degrees Celsius, which is a formed body, covering an entire area of an upper surface of the base layer, wherein the covering layer includes a linear structure, the linear structure is formed of a linear portion, and the base layer is made of a shape memory material containing a shape memory polymer, the covering layer is made of an elastomer, the elastomer is softer than the shape memory material at 25 degrees Celsius,
a glass-transition temperature Tg of the shape memory polymer is 35 to 100 degrees Celsius,
a ratio of an elastic modulus of the shape memory polymer at Tg+20 degrees Celsius to an elastic modulus of the shape memory polymer at Tg-20 degrees Celsius is equal to or larger than 10,
the base layer and the covering layer are formed by laminating the linear structure which is formed of a linear resin by two-dimensionally moving a nozzle configured to eject the linear resin, and
the linear structure includes a plurality of grooves extending parallel to one another.

* * * * *